United States Patent
White et al.

(10) Patent No.: US 7,311,358 B2
(45) Date of Patent: Dec. 25, 2007

(54) SEAT CUSHION PRESENTER DEVICE FOR FOLDING SEAT

(75) Inventors: Brennon White, Commerce, MI (US); Renato Colja, Windsor (CA); Robert McMillen, Tecumseh (CA); Alan J. King, Wixom, MI (US); Barry Jones, Tecumseh (CA); Danny D. Alexander, Horton, MI (US); Vanja Cemalovic, Northville, MI (US); Robert Coon, Chicago, IL (US); Elliott Hsu, Chicago, IL (US)

(73) Assignee: Johnson Controls Technology Company, Holland, MI (US)

( * ) Notice: Subject to any disclaimer, the term of this patent is extended or adjusted under 35 U.S.C. 154(b) by 105 days.

(21) Appl. No.: 10/515,885

(22) PCT Filed: Nov. 7, 2003

(86) PCT No.: PCT/US03/35565

§ 371 (c)(1),
(2), (4) Date: Sep. 1, 2005

(87) PCT Pub. No.: WO2004/043207

PCT Pub. Date: May 27, 2004

(65) Prior Publication Data

US 2006/0091705 A1 May 4, 2006

Related U.S. Application Data

(60) Provisional application No. 60/425,225, filed on Nov. 8, 2002, provisional application No. 60/454,263, filed on Mar. 13, 2003.

(51) Int. Cl.
A47C 3/00 (2006.01)

(52) U.S. Cl. .................................. 297/284.9; 297/284.1

(58) Field of Classification Search ............. 297/284.4, 297/284.9, 284.1
See application file for complete search history.

(56) References Cited

U.S. PATENT DOCUMENTS

| 3,145,054 A | 8/1964 | Sopko, Jr. |
| 3,326,601 A | 6/1967 | Vanderbilt et al. |
| 3,652,126 A | 3/1972 | Folling |

(Continued)

FOREIGN PATENT DOCUMENTS

| DE | 197 37 270 C1 | 3/1999 |

(Continued)

OTHER PUBLICATIONS

The International Search Report, based on International Application No. PCT/US03/35565, May 17, 2004, (4 pgs.).

*Primary Examiner*—Sarah B. McPartlin
(74) *Attorney, Agent, or Firm*—Foley & Lardner LLP

(57) ABSTRACT

A seat back cushion support presenting device for use in a foldable vehicle seat moves a cushion support member from a position within the seat back frame to a position extended from the seat back frame such that the entire cushion is presented. A pair of presenting members, each including a side bolster support portion, are provided in overlapping arrangement for translation along a presenting device support member and rotation with respect to a cushion support member such that as an activation member moves the presenting members together, the cushion support member is extended along with the side bolster support portions.

15 Claims, 19 Drawing Sheets

U.S. PATENT DOCUMENTS

| | | | | |
|---|---|---|---|---|
| 3,867,732 | A | 2/1975 | Morrell | |
| 3,929,374 | A | 12/1975 | Hogan et al. | |
| 4,162,807 | A | 7/1979 | Yoshimura | |
| 4,316,631 | A | 2/1982 | Lenz et al. | |
| 4,518,200 | A | 5/1985 | Armstrong | |
| 4,536,030 | A * | 8/1985 | Sakurada et al. | 297/284.9 |
| 4,671,569 | A | 6/1987 | Kazaoka et al. | |
| 4,789,202 | A | 12/1988 | Alter | |
| 4,909,568 | A | 3/1990 | Dal Monte | |
| 4,965,899 | A | 10/1990 | Sekido et al. | |
| 5,007,677 | A | 4/1991 | Ozawa et al. | |
| 5,197,780 | A | 3/1993 | Coughlin | |
| 5,286,087 | A | 2/1994 | Elton | |
| 5,316,375 | A * | 5/1994 | Breen | 297/452.34 |
| 5,352,018 | A | 10/1994 | Arakawa et al. | |
| 5,425,569 | A | 6/1995 | Hayes | |
| 5,651,584 | A | 7/1997 | Chenot et al. | |
| 5,658,050 | A | 8/1997 | Lorbiecki | |
| 5,671,978 | A | 9/1997 | Olsson | |
| 5,673,972 | A | 10/1997 | Dudash et al. | |
| 5,697,672 | A | 12/1997 | Mitchell | |
| 5,823,620 | A | 10/1998 | Le Caz | |
| 5,836,647 | A | 11/1998 | Turman | |
| 5,967,608 | A * | 10/1999 | Van Sickle | 297/284.6 |
| 6,033,024 | A * | 3/2000 | Pfau et al. | 297/452.26 |
| 6,036,265 | A | 3/2000 | Cosentino | |
| 6,068,336 | A | 5/2000 | Schönauer | |
| 6,089,664 | A | 7/2000 | Yoshida | |
| 6,129,419 | A * | 10/2000 | Neale | 297/284.4 |
| 6,270,158 | B1 | 8/2001 | Hong | |
| 6,390,553 | B1 | 5/2002 | LeBlanc | |
| 6,450,579 | B1 | 9/2002 | Nylander et al. | |
| 6,454,352 | B1 | 9/2002 | Konovalov et al. | |
| 6,499,803 | B2 * | 12/2002 | Nakane et al. | 297/284.4 |
| 6,554,360 | B1 * | 4/2003 | Wilke et al. | 297/342 |
| 6,601,919 | B1 * | 8/2003 | Deceuninck | 297/284.4 |
| 6,623,076 | B2 * | 9/2003 | Klingler | 297/284.4 |
| 2001/0022458 | A1 | 9/2001 | Küster et al. | |

FOREIGN PATENT DOCUMENTS

DE 201 00 018 U1 2/2002

* cited by examiner

SEAT CUSHION PRESENTER DEVICE FOR FOLDING SEAT

Cross-Reference to Related Applications

This application is the National Stage Application of PCT/US2003/35565, filed on Nov. 7, 2003 and claims priority under 35 U.S.C. § 119 based on U.S. Provisional Application No. 60/425,225, filed Nov. 8, 2002 and U.S. Provisional Application No. 60/454,263, filed Mar. 13, 2003, all of which are incorporated herein.

BACKGROUND OF THE INVENTION

The present invention relates generally to the field of seats, and more particularly to the field of folding vehicle seats.

A wide variety of vehicle seating designs and devices (e.g., preferably for use in positions other than the driver position) are known. The variety of such seats is increasing at a rapid pace with the increasing popularity of untraditional vehicles as compared to the standard two-row sedans, wagons and trucks. For example, vans, sport utility vehicles (SUV), cross-over utility vehicles (CUV); station wagons, pick-up trucks, and other vehicles include additional rows of seating, and many of them provide for the reconfiguration and/or removal of seats to increase the cargo storage space for the vehicle.

In larger SUVs, vans and even minivans, there is sufficient room within the entire vehicle that there is not such a need to provide a second and/or third row vehicle seat that can be stowed in a relatively ultra compact package. However, to have such an option would be advantageous. Notwithstanding, it has been common to provide conventional vehicle seats in such larger vehicles and to provide some level of adjustment or folding to give the vehicle user additional storage options and area.

In relatively smaller SUVs, minivans, CUVs and station wagons, there is less room to provide a relatively bulky and massive vehicle seat since the vehicle user typically desires as much cargo space as possible but still wants the ability to provide occupant seating for up to seven or eight occupants.

In many cases, the seats which are used for such purposes (and in particular for third row applications) are used by vehicle passengers on only limited occasions, and the result has been that such seats are not particularly comfortable. Such seats also tend to be relatively bulky and, if left in the vehicle, reduce the amount of cargo space which may be used for a wide variety of purposes. Ultimately, many of the seating systems known to the art can be removed at the option of the operator and stored in the garage or other location where the vehicle is kept. However, conventional seats tend to be too heavy and bulky for removal by smaller operators or people who are elderly or otherwise do not have the sufficient strength to manipulate the heavy and bulky seat designs. While some devices have been developed to help in this regard such as by adding wheels to the seat, they have proved insufficient and there is a continued need to improve seats in this regard.

In view of the above, there is a current trend to develop thinner profile and lighter seats. However, these efforts have focused on optimizing current designs to simply be thinner and lighter resulting in decreased occupant comfort.

Numerous types of conventional devices are known for use in vehicle seats. For example, the use of an inflatable bladder is known for use with seating in back supporting or other localized areas as illustrated in Sopko, Jr., U.S. Pat. No. 3,145,054, issued Aug. 18, 1964, for "Portable Chair Seat with a Back-Supporting Pneumatic Cushion." Another "Inflatable Back Support for a Seat" is described in Vanderbilt et al., U.S. Pat. No. 3,326,601, issued Jun. 20, 1967. Back supports for non-vehicle seats are also known, as for example, the seat and back inflatable portions of the "Pneumatic Adjustment System for Seatback Panel" described in U.S. Pat. No. 3,652,126, issued Mar. 28, 1972, to Foiling.

Seat cushions also are known which have inflatable aspects. Alternating inflatable tubes (to enhance driver alertness) are provided in a "Seat Cushion" patent, U.S. Pat. No. 3,867,732, issued Feb. 25, 1975, to Morrell. Hand inflatable lumbar supports which include an inflatable bladder and a special neck portion are described in U.S. Pat. No. 4,518,200, issued May 21, 1985, to Armstrong for "Seat Pad with Adjustable Lumbar Support."

An "Inflatable Seat Cushion" is described in Alter, U.S. Pat. No. 4,789,202, issued Dec. 6, 1988. This device includes an inflatable member mounted in the back section and positioned primarily to provide support for the lumbar region and which is adjustable based on the needs of a particular individual.

Numerous embodiments of seats are disclosed in Sekido et al., U.S. Pat. No. 4,965,899, issued Oct. 30, 1990, for "Air Cushion for Chair and Chair Utilizing the Air Cushion" and Lorbiecki, U.S. Pat. No. 5,658,050, issued Aug. 19, 1997, for "Vehicle Seat with Inflatable Bladder." Conventional comfort seating structures which do not focus on the use of inflatable systems include U.S. Pat. No. 5,673,972, issued Oct. 7, 1997, to Dudash et al., entitled "Vehicle Seat Assembly"; U.S. Pat. No. 6,390,553, issued May 21, 2002 to LeBlanc, for "Back-Support Device"; and U.S. Pat. No. 6,454,352, issued Sep. 24, 2002, to Konovalov et al. for "Car Seat Pad."

One additional known vehicle seat suspension system is disclosed in U.S. Pat. No. 5,984,410, to Brodersen, which discloses a scissors-jack type vehicle seat support frame for adjusting the position of a seat base of the vehicle seat. Brodersen discloses that the scissors-jack support frame is provided with a pneumatic member supporting the mechanism. Brodersen further discloses that a spring is fixed to an upper housing having a cable attached to the spring and an actuator knob connected to the other end of the cable to allow the occupant to tighten or loosen the cable and raise or lower the seat that is infinitely adjustable.

While a number of the conventional systems provide relatively enhanced comfort and support for a seat occupant, they do not address the needs of the field of this invention, i.e., comfortable seating usable within a vehicle such as in a third row application which will allow a vehicle user to have the preferred storage area in the vehicle and the needed ability to seat additional occupants. Further, there is a continued need to develop a vehicle seat that can be made foldable for storage or removal within less than a 200 millimeter thickness.

In particular, there remains a continued need to provide more storage area in a vehicle's cargo area while retaining as much functionality and convenience as possible. One conventional approach has been to provide rear seats that can be removed from the vehicle. However, such conventional seats are still considered too heavy for even most average users to remove. While other conventional approaches are known to provide a folding seat that can be stowed in the vehicle floor or bottom, conventional seats have not been designed to provide less than a 200 millimeter thickness. Thus, there is a continued need to develop a vehicle seat that can be made foldable for storage or removal within less than a 150 millimeter thickness and optimally within less than a 100 millimeter thickness package while still maximizing comfort.

Conventional folding seats have also been poorly designed since they require a large amount of floor space to be folded and stowed. Thus, there remains a need to provide a vehicle seat capable of providing a fold-in spot, compact foot print package in combination with a seat cushion contour presenting device capable of presenting a complete seat back cushion. There also remains a continued need to develop a vehicle seat that will, in a folded position, provide a minimized and light-weight cartridge and that will, in a deployed position, provide the support and comfort of a conventional, non-stowing type vehicle seat. Some conventional systems have attempted to develop solutions to vehicle seating which undesirably require changes to the vehicle's body, resulting in significant additional cost and highly undesirable lack of flexibility. Some conventional folding vehicle seat systems have provided foldable seats but once in the folded position have the highly undesirable drawback of not providing a flat load. Thus, there remains a continued need to provide a device usable in a vehicle seat and capable of solving the noted deficiencies with the prior art.

SUMMARY OF THE INVENTION

One embodiment of the present invention relates to a foldable and stowable vehicle seat including a seat cushion presenting device preferably for presenting a seat back cushion relative to a seat back frame of the vehicle seat. The vehicle seat of the one embodiment further includes a seat back cushion and a seat back finish cover and can be applied to a vehicle seat in any location or row in a vehicle. The seat cushion presenting device of the one embodiment of the present invention includes a seat back basket member extending over at least a portion of the seat back and designed to support the seat back cushion between a first stow position when the vehicle seat is in the stow position and a second presentation position when the vehicle seat is in the occupant or design position. When the vehicle seat is in the stow position, the seat cushion presenting device is in its most fully retracted position and when the vehicle seat is in the design position, the seat cushion presentation device is in its most fully extended or presentation position such that the seat back cushion is moved to its furthest extent with respect to the seat back frame.

In one embodiment of the present invention, the seat cushion presenting device includes a seat cushion, a seat cushion support member for receiving the seat cushion on one side thereof, and a pair of (first and second) presenting members positioned in substantially opposite directions and crossing each other. Each of the first and second presenting members have a first end adapted to translate along a first guide member connected to the seat back frame and each have a second end for connection with a portion of the seat cushion support member.

The one embodiment of the present invention further includes an activation member for moving the first ends of the first and second presenting members with respect to each other such that the second ends of the first and second presenting members move the seat cushion support member with respect to the seat frame.

In one embodiment of the present invention, the activation member preferably includes a cable and conduit or conduit such as that known as a Bowden cable. In this embodiment, the cable has a first end connected to one of the first ends of the first and second crossing presentation members and a second end connected to a moving member adapted to move the cable. The conduit has a first end connected to the other of the first ends of the first and second crossing members and a second end made stationary such that the cable will move with respect to the sheath to cause the first ends of the first and second crossing members to move with respect to one another.

In one alternate embodiment of the present invention, the activation member is a screw thread member interconnecting the first ends of the first and second presenting members to move them with respect to each other such that the second ends of the first and second presenting members move the seat cushion support member with respect to the seat frame. Further, a motor is provided for rotating the screw thread member such that the seat cushion presenter device is motorized.

In one embodiment of the present invention, the activation member preferably includes a biasing member for absorbing at least a portion of a load applied to the seat cushion and seat cushion support member by an occupant of the vehicle seat. Preferably the biasing member is a spring connected between the cable and conduit to allow biased relative movement.

In one alternate embodiment of the present invention, the guide member defines a first axis and the first ends of the crossing first and second presentation members are adapted for both translation along the guide member and rotation of the first end second presentation members about the first ends on the first axis.

In one alternate embodiment of the present invention, the guide member includes a wire having a first end connected to a first portion of the seat frame and a second end connected to an opposed second portion of the seat frame and the first ends of the first and second presentation members are adapted for movement along the wire and for rotational movement of the first and second presentation members with respect to the wire. In a further alternate embodiment, the wire guide member is a chord wire. In yet a further alternate embodiment, the seat frame member is a bent tubular structure and includes a first plane defined by one side of the tubular structure and the guide member is attached to the tubular structure of the seat frame member such that the axis defined by the guide member is in the first plane defined by the seat frame member.

In one embodiment of the present invention, the seat cushion presenting device includes a seat cushion support member defined by a planar wire basket design. Further, the seat cushion support member includes first and second side bolster wing members each located on opposing side portions of the seat cushion support member and each aligned at a predefined angle with respect to the seat cushion support member. Further, in one embodiment of the present invention each second end of the first and second presenting members is connected to a respective bolster wing of the first and second side bolster wing members of the seat cushion support member such that when the seat cushion support member moves from the stow position to the design position the angular position of the first and second bolster wings with respect to the planar wire basket increases.

In one embodiment of the present invention, the seat cushion support member includes a first or upper end and an attachment member for connecting the upper end of the seat cushion support member to the seat frame. In an alternate embodiment of the present invention, the seat cushion support member includes a second or lower end and an attachment member for connecting the lower end of the seat cushion support member to the seat frame.

Other ways in which the above-referenced features are accomplished will become apparent to those skilled in the art after they have read this specification, and such other ways are deemed by the present inventors to fall within the scope of the present invention.

DETAILED DESCRIPTION OF THE PREFERRED EMBODIMENTS

Figure 22:
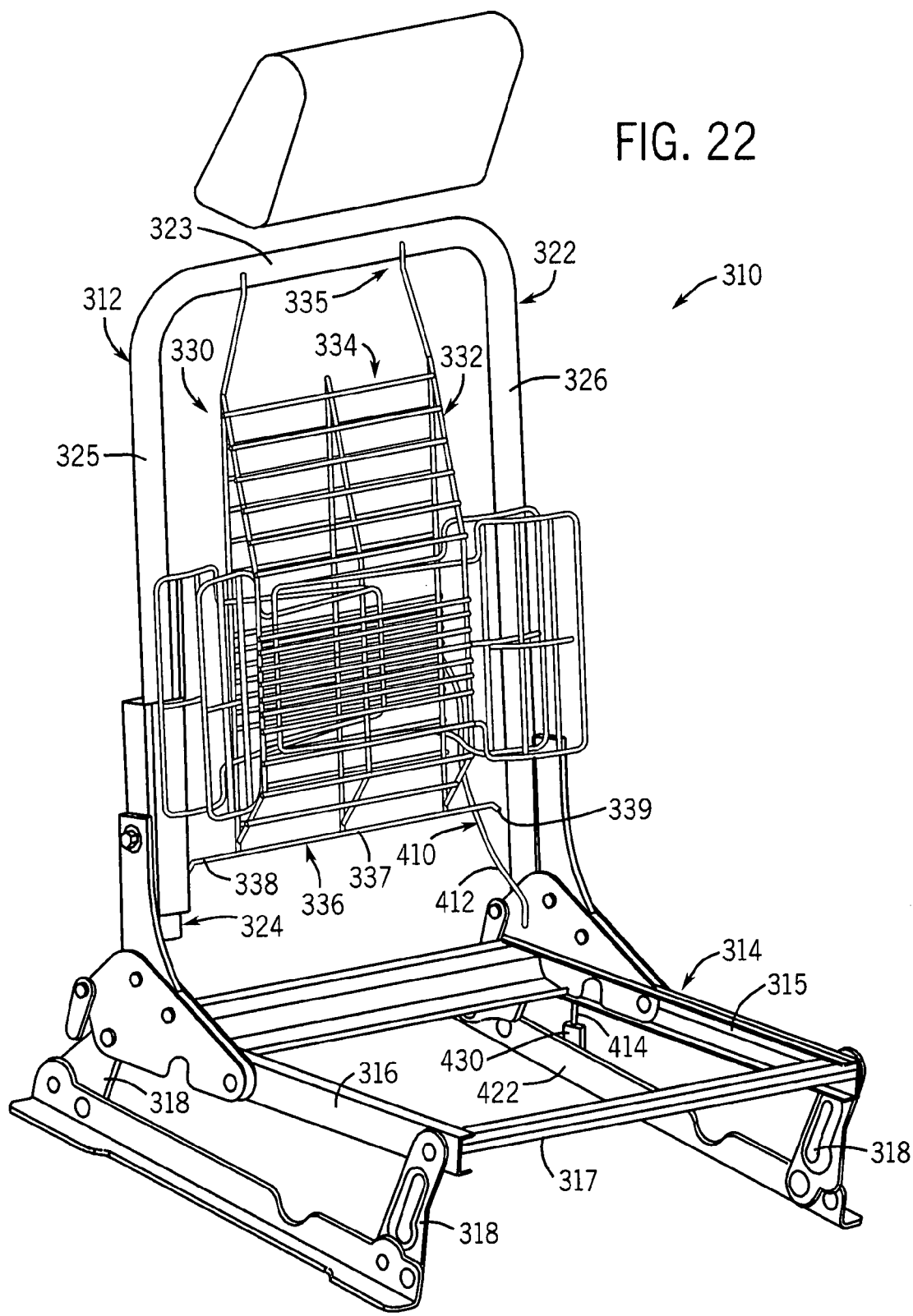
FIG. 22 is a front perspective view of a vehicle seat including a seat cushion presenting device according to the present invention.
Figure 23:
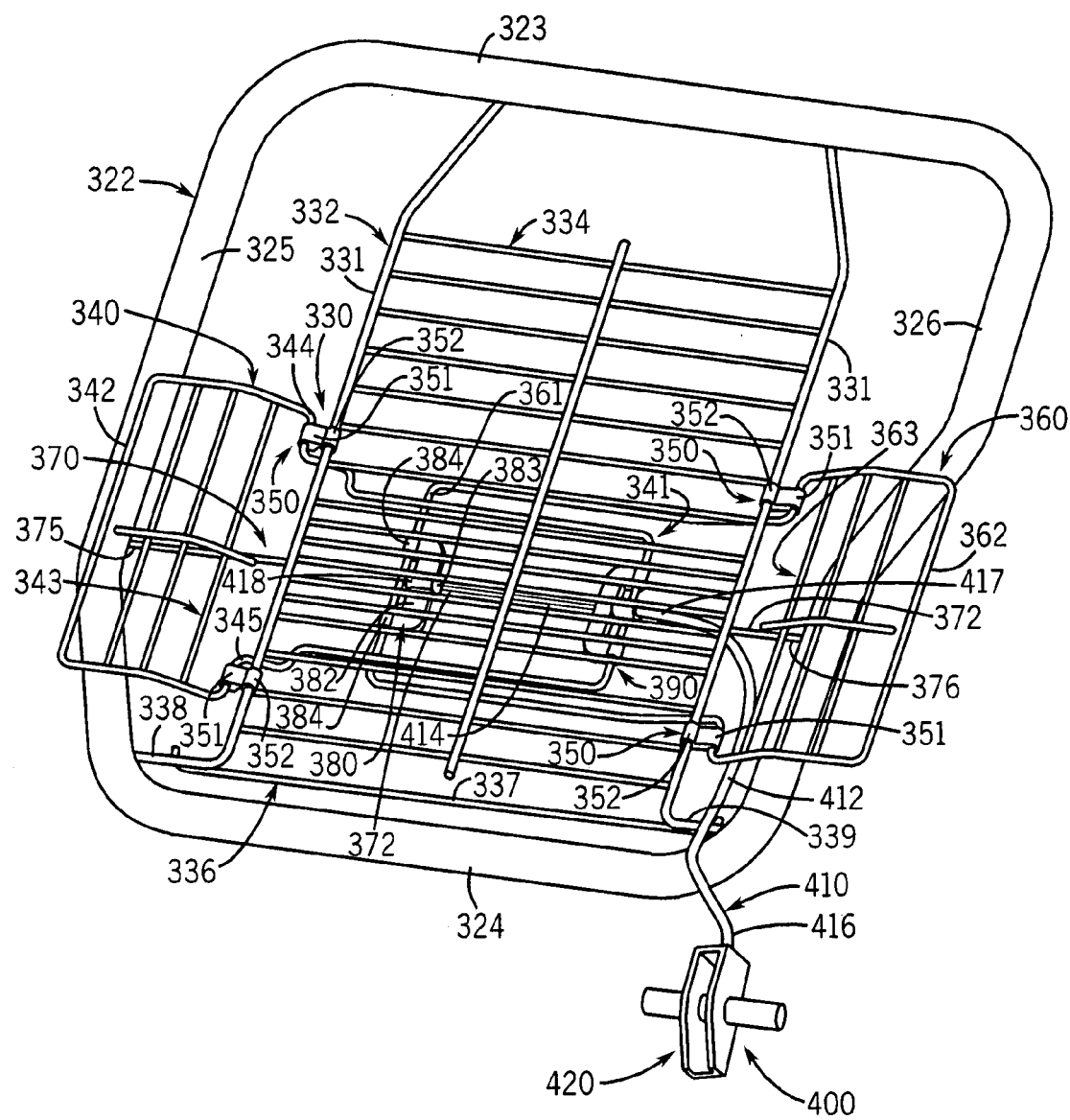
FIG. 23 is a front partial perspective view of a vehicle seat back member of the vehicle seat of FIG. 22 including a seat cushion presenting device according to the present invention.
Figure 24:
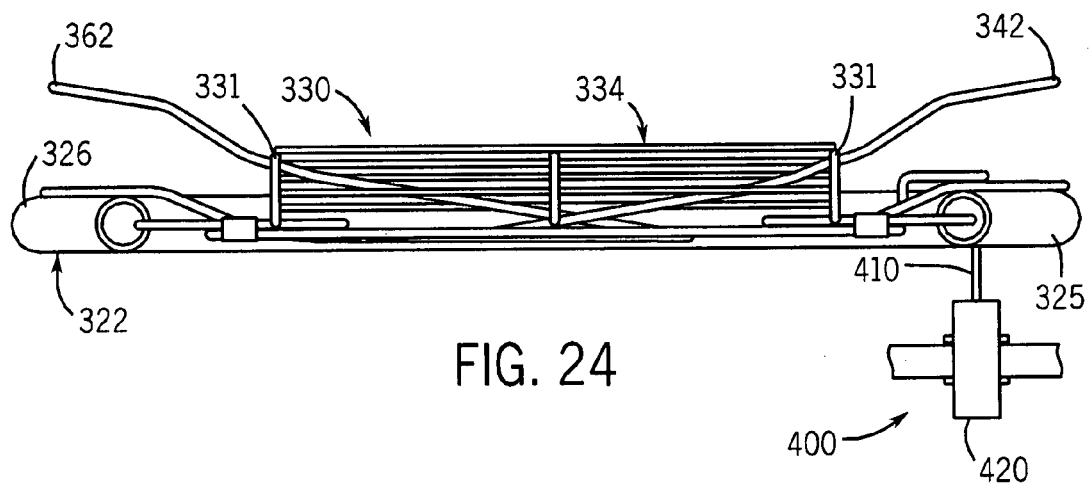
FIG. 24 is a partial end view of the vehicle seat back member of FIG. 22 showing the seat cushion presenting device in an extended or design position.

Referring generally to FIGS. 22-25 and more particularly to FIGS. 22-24, there is shown a vehicle seat 310 including a seat back member 312 and a seat base member 314. The seat base member 314 includes side members 315 and 316 and front member 317. The vehicle seat 310 is preferably adapted to connect to a floor (not shown) of a vehicle (not shown) for movement between a stowed position and a design position as shown in FIG. 22. The vehicle seat 310 is preferably supported by legs 318 for moving the vehicle seat 310 between the stowed position and the design position. The vehicle seat 310 is disclosed as a single occupant seat but may alternatively be a multiple occupant design (such as a "bench" seat) and may also be part of a split seat such as a 50-50 or 60-40 split bench seat or any other configuration.

The seat back member 312 of the vehicle seat 310 includes a seat back frame member 322 preferably having a substantially rectangular shape and made of a tubular steel or any other appropriate shape and type of material. The seat back frame member 322 preferably has an upper end 323, a lower end 324 and two sides 325 and 326. As shown, the seat back frame member 322 is a single piece, bent and shaped tubular member but may alternatively be made having any known or appropriate configuration or sub-assemblies.

The seat back member 312 of the vehicle seat 310 further includes a seat cushion presenting device 330 connected to the seat back frame member 322. The seat cushion presenting device 330 includes a seat back cushion support member 332. The seat back cushion support member 332 is preferably constructed as a steel wire basket design having a central body portion 334 extending over the middle portion of the seat frame member 322 from the upper end 323 toward the lower end 324 and a pair of side members 331 having a substantially wire rod construction. However, the seat back cushion support member 332 may alternatively be made from plastic and other materials and may also be made in alternative configurations as long as it will appropriately function to support a seat cushion material (not shown) and connect to the seat back frame member 322 and function with the seat cushion presenting device 330 as described herein.

The seat back cushion support member 332 further includes an upper end 335 for connection with the upper end 323 of the seat back frame member 322 and a lower end 336 for connection with the lower end 324 of the seat back frame member 322. The lower end 336 of the seat back cushion support member 332 includes an extended member 337 interconnecting the body portion 334 and the seat back frame member 322. The extended member 337 preferably includes a pair of extension members 338 and 339 for connection to one of preferably the sides 325 and 326 and the lower end 324. In particular, the extended member 337 is preferably a relatively rigid wire rod connected to the seat back frame member 322 but may alternatively be of any appropriate configuration.

The seat back cushion support member 332 is preferably connected to the seat back frame member 322 using any known or appropriate connection that will provide a durable and lasting connection and will functionally accommodate the movement of the seat back cushion support member 332 between the stowed and design positions as well as during use. Preferably the seat back cushion support member 332 is connected to the seat back frame member 322 by having the ends of the seat back cushion support, member anchored in a passage in the seat back frame member 322 as is conventional. Alternatively, it is also possible to use a connector or similar device (not shown).

Figure 25:
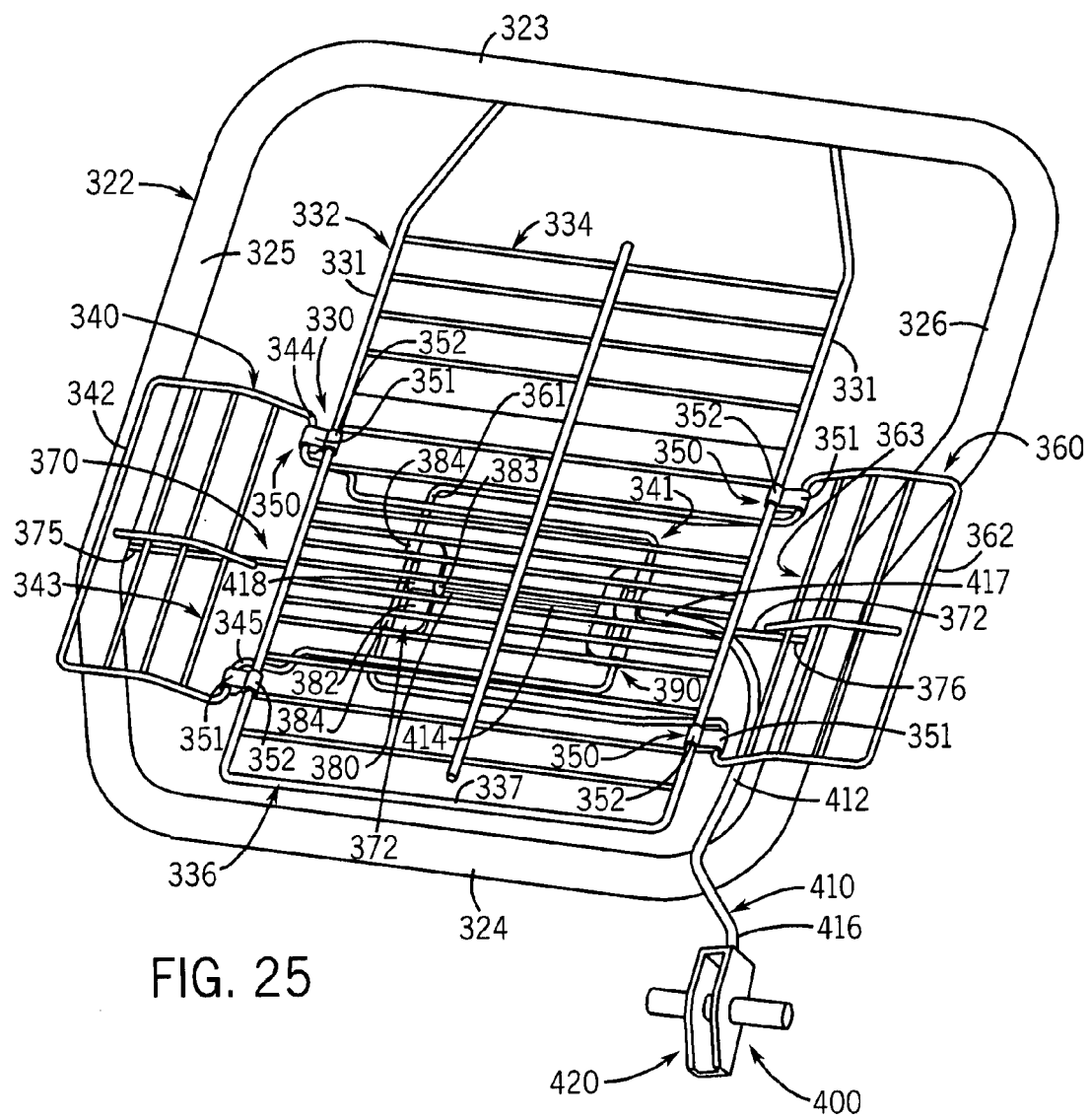
FIG. 25 is a front partial perspective view of an alternate embodiment of the vehicle seat back member of FIG. 22.

In one alternate embodiment as shown in FIG. 25, the seat back cushion support member 332 does not include the extended member 337 and the extension members 338 and 339. Instead, the lower end 336 of the seat back cushion support member 332 moves outward from the seat frame member 322 along with the main body portion 334 of the seat back cushion support member 332. This alternate embodiment has the advantage of providing additional support particularly in the lower back region to an occupant of the vehicle seat 310.

As best shown in FIG. 23, the seat cushion presenting device 330 connected to the seat back frame member 322 further preferably includes first and second presenting members 340 and 360. The first and second presenting members 340 and 360 are also preferably wire form structures utilizing conventional standard gage wire for use in vehicle seating. Alternatively, the first and second presenting members 340 and 360 may be made utilizing any known or appropriate material and construction. The first and second presenting members 340 and 360 are relatively mirror images of each other so they will be described by way of recitation to the first presenting member 340 with the understanding that the similar description is accurate and appropriate for the second presenting member 360 except as specifically noted.

The first presenting member 340 has a first end 341 located with respect to and on the back side of the main body portion 334 of the seat cushion support member 330 and an opposite distal end 342 located on the front side of and with respect to the seat back frame member 322. The first end 341 has a substantially U-shaped, wire form construction extending substantially horizontally between the sides 325 and 326 of the seat back frame member 322 and preferably contained within the thickness of the seat back frame member 322 when the seat cushion support member 330 is located in the stowed position.

The second end 342 of the first presenting member 340 preferably includes a side bolster support member 343 having a substantially wire frame support structure and extending substantially between the central body portion 334 of the seat cushion support member 330 and the side 325 of the seat back frame member 322. Preferably the second end 342 and the side bolster support portion 343 extend vertically more than the first end 341 to provide more support to an occupant of the vehicle seat 310 but may alternatively have the same or smaller relation to the first end 341. The side bolster support portion 343 preferably includes a first and second connection points 344 and 345 located between the first and second ends 341 and 342, respectively, and with respect to the side member 331 of the central body portion 334 of the seat cushion support member 330. The first and second connection points 344 and 345 are preferably a substantially vertically extending portion of the wire form structure comprising the first presenting member 340 but may alternatively be any attached, connected or other integrated structure.

The seat cushion presenting device 330 further includes at least one connection clip 350 for connecting the first presenting member 340 to the side member 331 of the central body portion 334 of the seat cushion support member 332. The connection clip 350 includes a first portion 351 for making a rotatable connection with the first connection point 344 of the first presenting member 340. The connection clip 350 also includes a second portion 352 located distal of the first portion 351. The second portion 352 is adapted to preferably make a rotatable connection with the side member 331 of the central body portion of the seat cushion support member 332. While the first and second portions 351 and 352 are adapted for achieving a rotatable connection, they are also preferably adapted such that at their respective points of connection, they do not allow translation of the first presenting member 340 with respect to seat cushion support member 332. The connection clip 351 is preferably made of a plastic material but may alternatively be made from any known or appropriate material and construction to perform the connection function as described above.

The seat cushion presenting device 330 further includes a presenting device support member 370 in the form of a corded wire 372 extending and stretched taught between the sides 325 and 326 of the seat back frame member 322. The wire 372 includes a first end 375 connected to side 325 and a second end 376 connected to side 326. The first and second ends 375 and 376 are connected to the sides 325 and 326, respectively, using any known or appropriate type of connection. By way of example, a portion of the end 375 is inserted in a hole in the side 325 and the wire 372 has a portion extend through a detent in the side 325 of the seat back support member 322. Preferably, a weld is made between the wire 372 and the side 325 in the area of the detent to fixedly secure the wire 372 to the seat back frame member 322. Further, the wire 372 is preferably connected to the seat back frame member 322 such that wire 372 is located and aligned with the back side of the seat back frame member 322 such that the first and second presenting members 340 and 360 may be aligned within the thickness of the seat back frame member 322. While the presenting device support member 370 is disclosed as a wire 372, it should be understood that other types of structure may be utilized.

First and second guide members 380 and 390 are provided for connecting the first and second presenting members 340 and 360, respectively, to the presenting device support member 370. The first and second guide members 380 and 390 are essentially identical and will be described with respect to the first guide member 380 with any material differences specifically noted. The first and second guide members 380 and 390 are preferably made from a plastic material but alternatively be made from any appropriate material.

The first guide member 380 includes a first central portion 382 having a passage 383 therein for receiving and movement along the wire 372. The passage 383 is preferably a hole but may have any other appropriate shape. The first guide support member 380 includes a pair of legs 384 for providing a rotational connection with the first end 361 of the second presenting member 360 and may alternatively have any other appropriate structure for providing such a connection. Thus, the first guide member translates along the wire 372 and causes the second presentation member 360 to force the seat cushion support member to extend from the seat back frame 322 via the clip connectors 350 and, at the same time, the side bolster portion 363 is extended from the seat back support frame 322.

The seat cushion presenting device 330 further includes an activation member 400 for moving the first and second presenting members 340 and 360 together along the presenting device support member 370. The activation member 400 preferably includes a cable 410 for activating the cushion presenting device 330. The cable 410 preferably has a sheath or conduit 412 and a wire 414. The conduit 412 preferably has a first end 416 anchored with respect to the cushion presenting device 330 such as by connection to a support 422 or other fixed aspect of the seat 310. The conduit 412 preferably has a second end 417 anchored in the guide member 390.

The first end of the wire 414 is preferably attached to a stationary part and the first end 416 of the conduit 412 is anchored to the seat frame 314 and the foldable vehicle seat 310 provides the movement of conduit 412 with respect to the wire 414 as the vehicle seat 310 is moved from the stowed position to the design position. In this regard, the wire 414 preferably has a first end attached to a lost motion device 430 connected to a support 422 or other structure stationary with respect to the seat base 314. The wire 414 further has a second end 418 anchored to the guide member 380 once the wire 414 of the cable 410 has passed through the passage 483. The lost motion device 430 preferably includes the first end of the wire 414 connected to one end of a compression spring contained within a housing of the lost motion device 430 such that as a force is applied to the wire 414, the first end of the wire 414 will act against the spring which will apply an equal and reactive force against the wire 414 until the compression spring reaches its limit of travel within the housing. Thus, the lost motion device 430 provides an additional level of support and cushion to the cushion presenting device 330 when an occupant of the seat 310 puts a force into the seat back 312.

In an alternate embodiment, the activation member 400 includes a drive unit 420 connected to the cable 410. When the drive unit 420 is activated, it applies a force on the wire 414 causing it to move within the conduit 412. Since the conduit 412 is anchored, the force applied to the wire 414 causes the second end 418 of the wire 414 and the second end 417 of the conduit 412 to move together (i.e., toward each other) thereby causing the first and second guide members 380 and 390 to move together and to move the first ends 341 and 361 together to cause the first and second presenting members 340 and 360 to move together and thereby causing the seat cushion support member 332 to extend from the seat back support frame 322.

Thus, it should be understood that the drive unit 420 may be any simple mechanical device and may alternatively have a handle attached for the occupant to move the handle and cause the force to be applied to the wire 414 thereby activating the cushion presenting device 330. Alternatively, the drive unit 420 may be motorized such that the seat cushion support member 330 may be extended automatically by the use of a simple switch.

The seat cushion presenting device may also be an inflatable type mechanism such as that disclosed in the commonly assigned provisional patent application entitled "Vehicle Seat Structures," in the name of White et al., filed on Nov. 8, 2002, Ser. No. 60/425,225, the disclosure of which is incorporated herein by reference.

Figure 13:
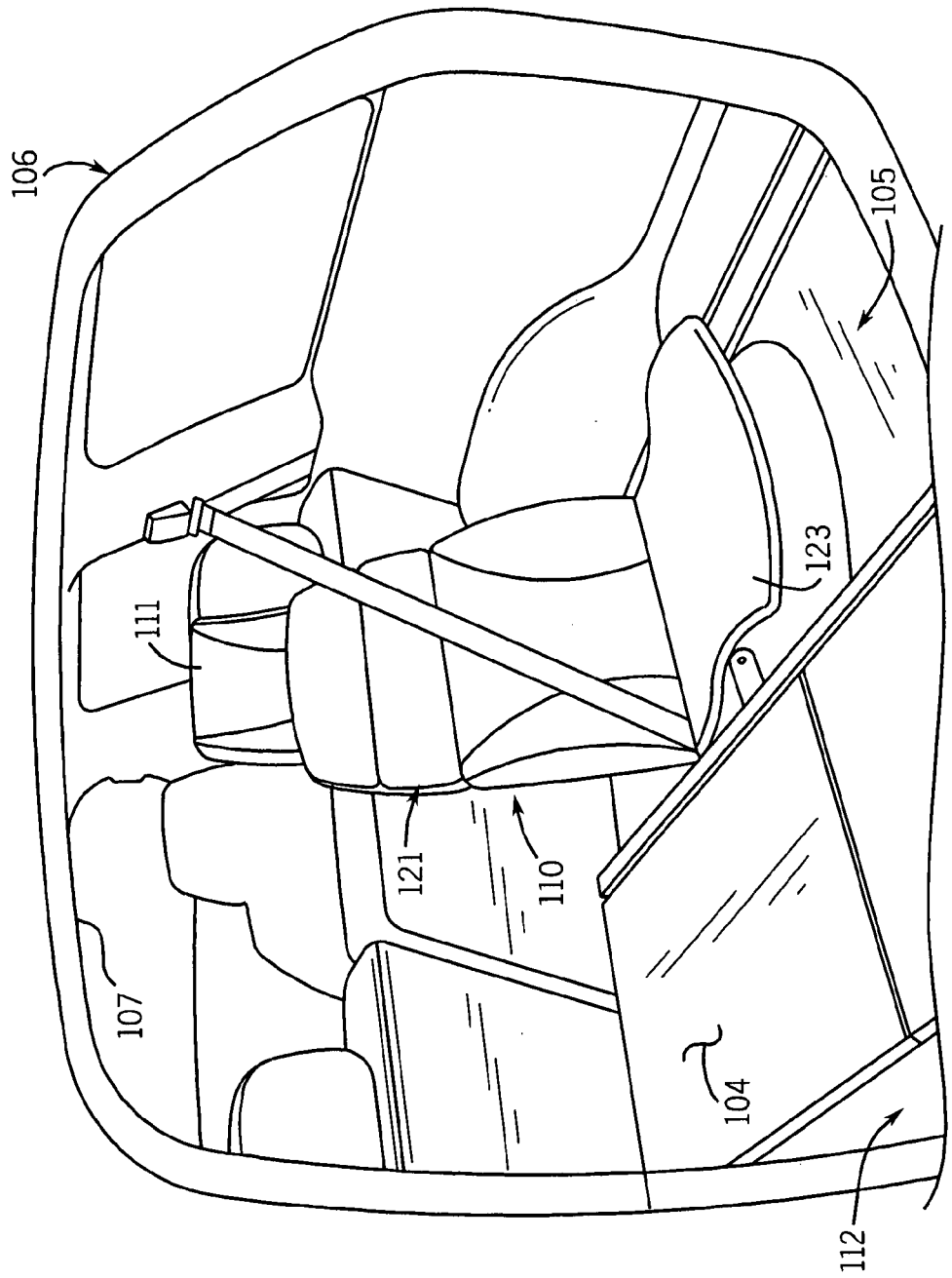
FIG. 13 is a perspective view of a fold flat vehicle seat according to the present invention.
Figure 14:
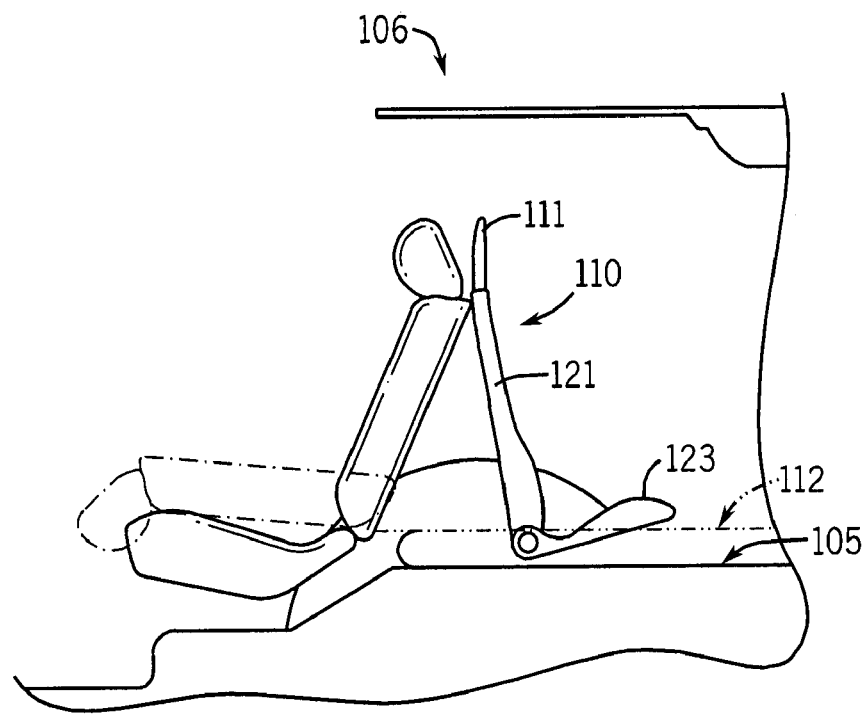
FIG. 14 is a side view of the seat of FIG. 13 showing the fold flat vehicle seat in a design position.
Figure 15:
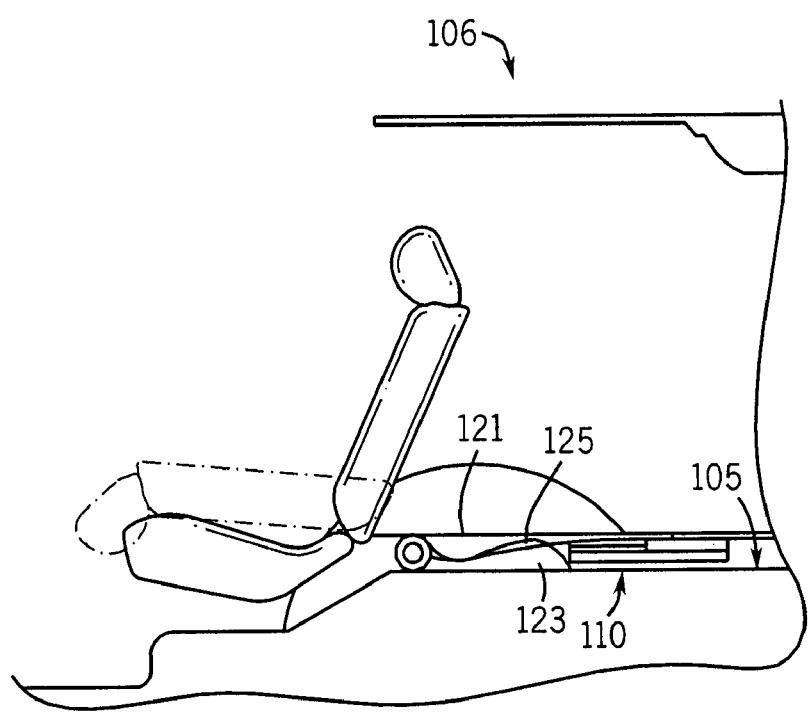
FIG. 15 is a side view of the seat of FIG. 13 showing the fold flat vehicle seat in a folded or stored position.
Figure 16:
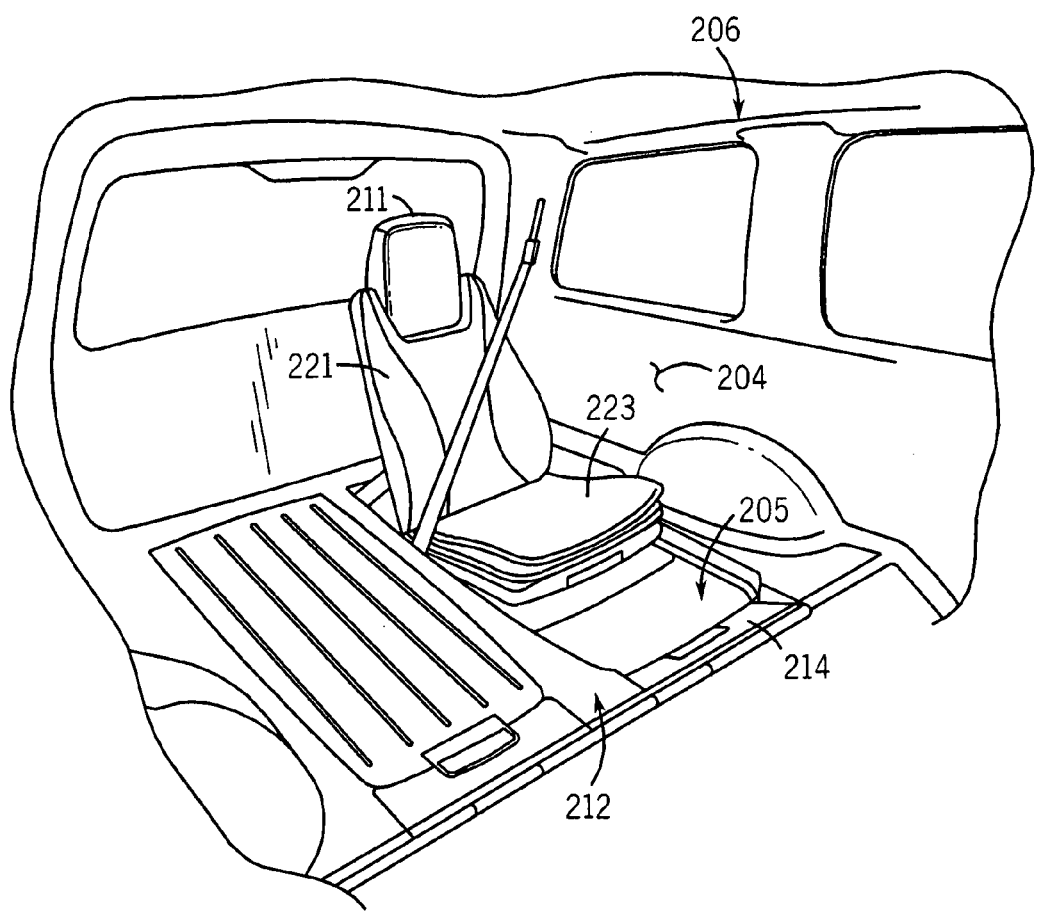
FIG. 16 is a perspective view of an inflatable cushion fold flat seat according to the present invention.

FIGS. 13-15 show a fold flat seat 110 in a rear compartment 104 of a vehicle 106 having a roof 107 of the type described in U.S. Patent Application No. 60/454,263. The seat 110 includes a headrest 111, a seat back 121 and a seat base 123. The seat 110 is supported in a recessed portion 105 of the floor 112 of the vehicle 106. The fold flat seat 110 is shown in a first or design position shown in FIG. 10. The fold flat seat 110 is designed to be very compact when it is located in a second or stowed position, as shown in FIG. 15, wherein the seat back 121 and the seat base 123 are designed to mesh together to provide an overlap region 125. Despite being quite compact, the fold flat seat 110 of the present invention is capable of providing support and comfort to a variety of seat occupants as shown in outline form in FIG. 14. The fold flat seat 110 includes support contours in the seat back 121 and the seat base 123 normally found in fold flat seats having a far thicker profile when folded flat.

In FIGS. 16-21 disclose a fold flat seat 211 for use in a rear cabin portion 204 of a vehicle 206 having a recessed portion 205 in a floor 212. The seat 211 may be folded flat to have a relatively very thin profile such that the required depth of the recess portion 205, for storing the seat 211, is minimized. The seat 211 includes a seat back 221 and a seat base 223. The seat back 221 is preferably adjustably connected to the seat base 223 using any known or appropriate mechanism for providing rotational coupling therebetween, while still providing the required operation and load transferring capability of a seat for use in a vehicle 206.

Figure 20:
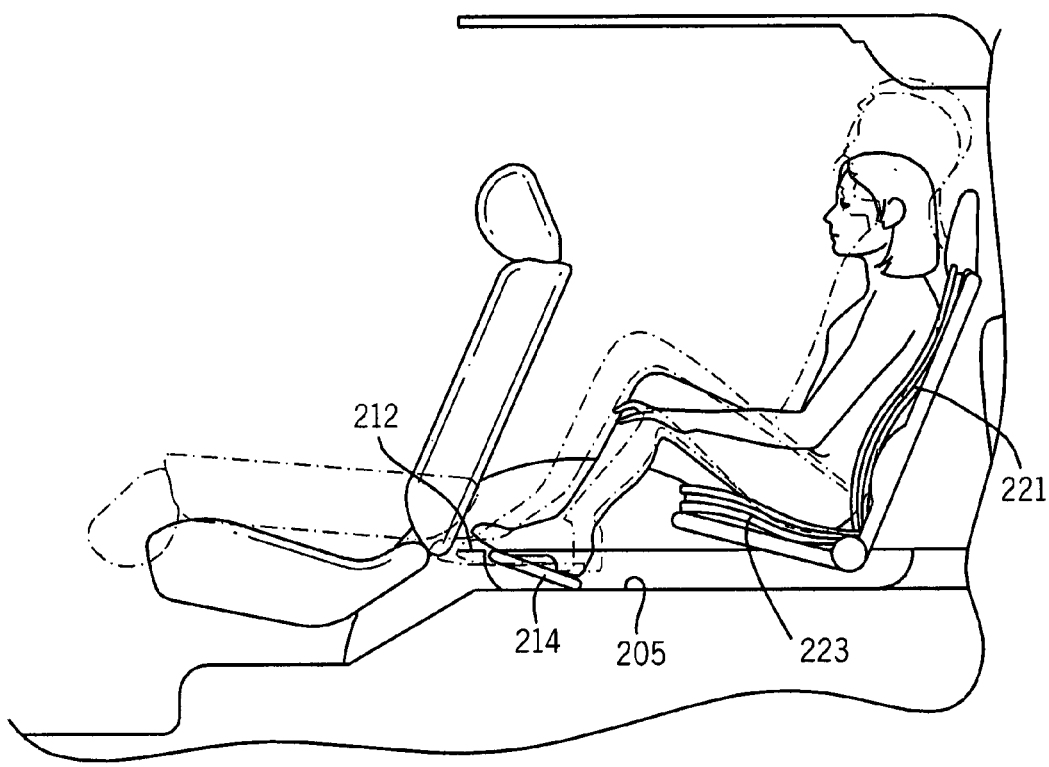
FIG. 20 is a side view of the inflatable cushion fold flat seat of FIG. 16 in a design position showing an occupant seated therein.
Figure 21:
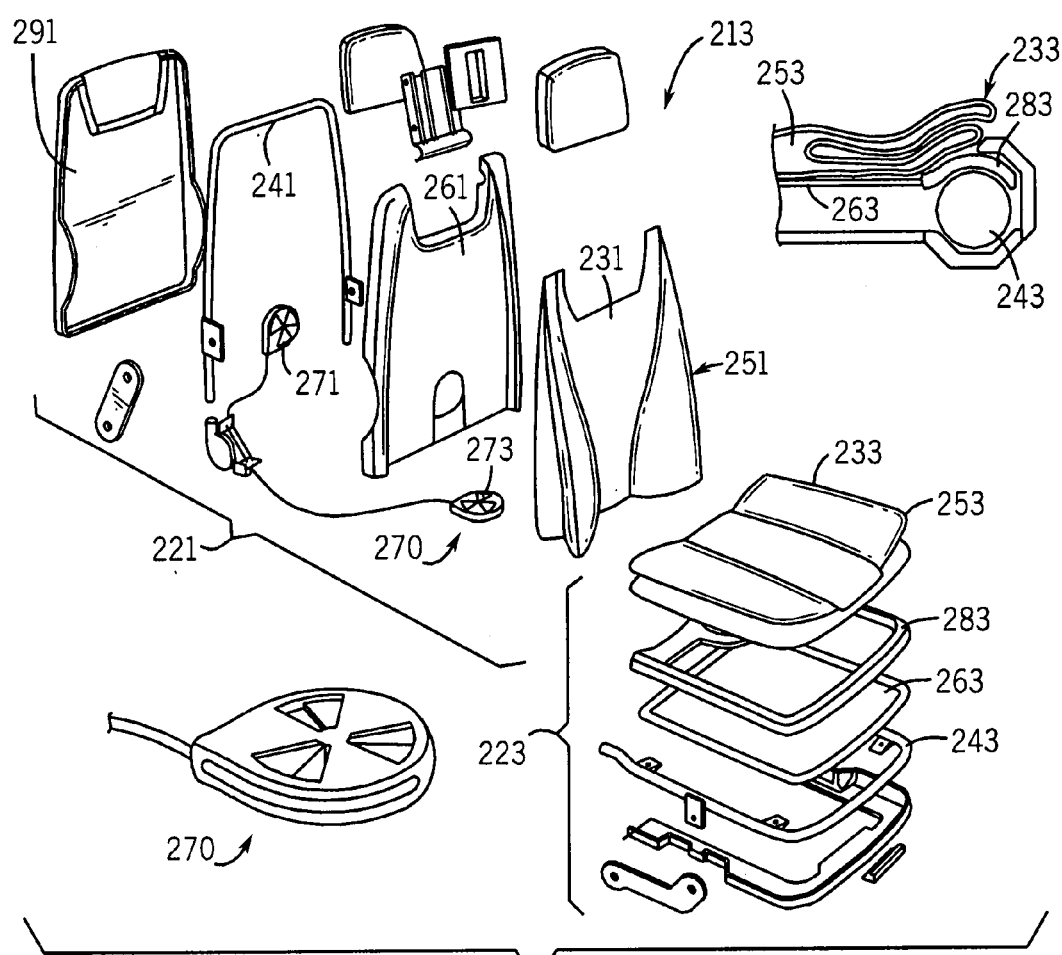
FIG. 21 is an exploded perspective view of the inflatable cushion fold flat seat of FIG. 16.

The fold flat seat 211 is designed to be stored in the recessed portion 205 such that when the seat 211 is in the stow or fold flat position, the back of the seat 211 constitutes a portion of the floor 212 of the vehicle 206. The floor 212 includes a flap portion 214 for providing access to the seat 211 and covering a portion thereof when the seat 211 is in the stow position. Further, the flap portion 214 is hinged to the floor 212 and pivots into the recessed portion 205 when the seat 211 is pivoted out of the recessed portion 205 such that the flap portion 214 provides an angled support for the feet of an occupant of the seat 211 as best shown in FIG. 20.

The fold flat seat 211 includes a seat cushion member 230 including a seat back cushion portion 231 and a seat base cushion portion 233. The seat cushion member 230 is preferably designed to include a bladder system 250 capable of being inflated with air or another fluid for providing comfort and support to a seat occupant and raising the seat cushion members 231 and 233. Further, the bladder system 250 preferably provides seat cushion contours by providing bladder portions selectively throughout the seat cushion member 230 such as thigh and side bolsters. The bladder system 250 preferably includes a bladder portion 251 aligned with the seat back cushion portion 231 and a bladder portion 253 aligned with the seat base cushion portion 233.

Figure 17:
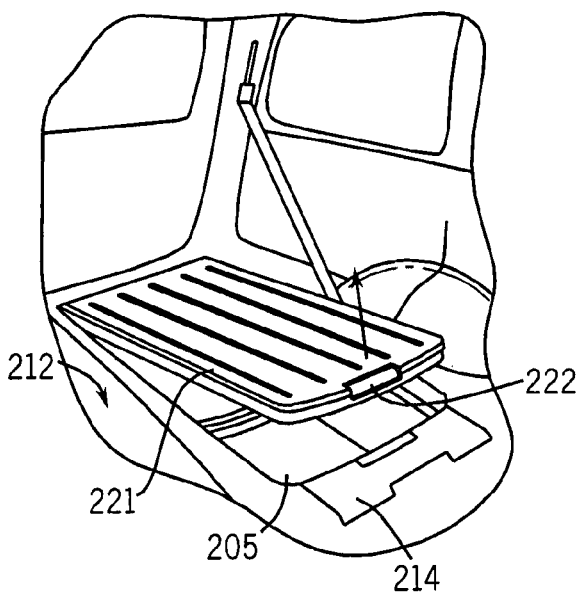
FIG. 17 is a perspective view of the inflatable cushion fold flat seat of FIG. 16 being moved from a storage position.
Figure 18:
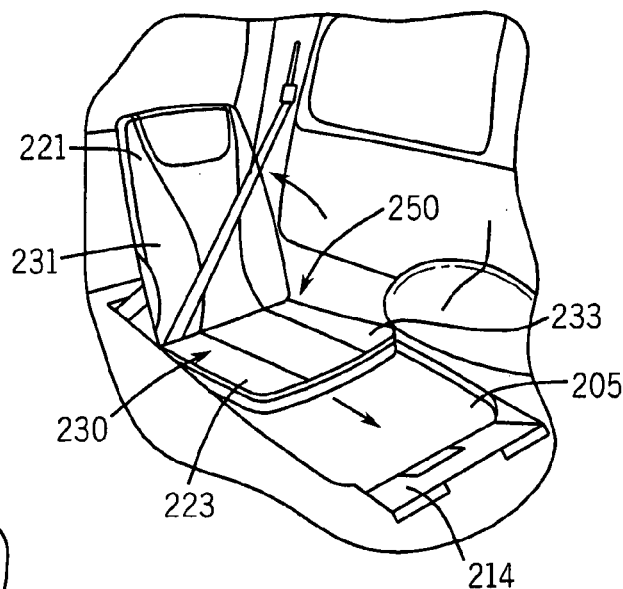
FIG. 18 is a perspective view of the inflatable cushion fold flat seat of FIG. 16 in a design position.
Figure 19:
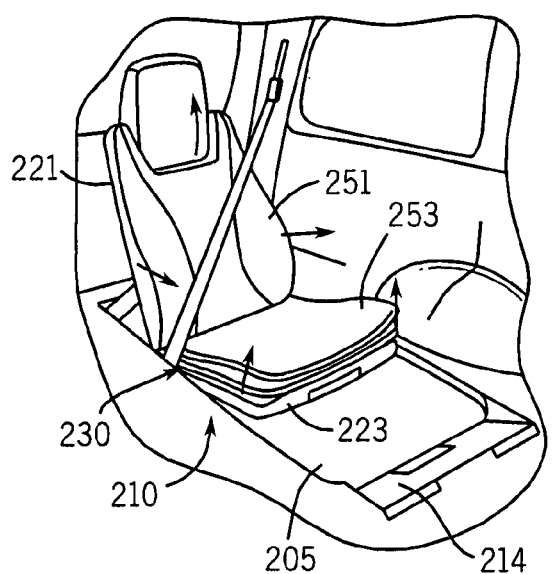
FIG. 19 is a perspective view of the inflatable cushion fold flat seat of FIG. 16 in a design position with the seat base and seat back cushions inflated.

As shown in FIGS. 17-19, the seat 211 is preferably movable between a first, stowed position and a second, deployed or design position. The seat 211, in the stowed position, is removed from the recessed portion 205 of the floor 212 of the vehicle 206, by pivoting the flap portion 214 and then moving the upper end of the seat back 221 such as by grasping a handle or recess portion 222 to rotate the seat back 221 from the recess 205 such as in the direction of the arrow in FIG. 17. It should be noted that when the seat 211 is folded flat in the recessed portion 205, the bladder system 250 is substantially void of air or other fluid. Without most of the air in the bladder system 250, the seat 211 may achieve a much thinner profile than if all of the air was kept in the bladder system 250 such as is preferable to best support an occupant.

As the seat back 221 is moved to the design position shown in FIG. 18, the bladder system 153 is activated to cause air to fill the bladder system 250 to cause the bladder portion 251 of the seat back cushion portion 231 to inflate the bladder portion 253 of the seat base cushion portion 233. Once the seat 211 is in the deployed position, the bladder system 250 is preferably deactivated, such as by turning off a valve, to trap the air therein and prevent its escape therefrom such as would result from the occupant sitting in the seat 211.

The seat 211 is also preferably provided with a very simple and efficient air moving system 270 for moving air into and out of the bladder system 250. The air moving system 270 preferably includes a first fan motor 271 for use with the seat back bladder portion 251 and a second fan motor 273 for use with the seat base bladder portion 253.

The seat base 223 of the seat 211 preferably further includes a seat base frame member 243 having a substantially U-shape, a suspension member 263 supported on the frame member 243 and a seat base capture member 283 for capturing the suspension member 263 to the frame member 243. The seat base capture member 283 further preferably has the seat base fan motor 273 connected thereto for communication with the seat base bladder portion 253 once the seat base cushion portion 233 is supported by the suspension member 263.

Similarly, the seat back 221 of the seat 211 preferably includes a seat back frame member 241 having a substantially U-shaped configuration, a support member 261 having the seat back fan motor 271 connected thereto for communication with the seat back bladder portion 251 once the seat back cushion portion 231 is connected to the seat back support member 261. Additionally, the seat back 221 of the seat 211 includes a back cover 291 for closing out the seat back 221 and providing a portion of the floor 212 of the vehicle 206 when the seat 211 is in the stowed position.

Preferably, the vehicle seat of the present invention is provided as a thin profile folding vehicle seat as described in commonly assigned U.S. Provisional Patent Application No. 60/454,379, filed on Mar. 13, 2003, and the disclosure of which is incorporated herein by reference.

Referring generally to FIG. 1 through FIG. 12 and more particularly to FIG. 1 through FIG. 8, there is shown a folding vehicle seat 10 of the type in commonly assigned U.S. Patent Application No. 60/454,379, including a seat back 12 and a seat base 14. The seat 10 further alternatively includes a headrest 16 which may be attached at the upper end of the seat back 12 as is conventional in the art of vehicle seats. The seat 10 is preferably supported on a pair of supports 22 for connection with a vehicle (not shown) or the floor of a vehicle. It should be appreciated that it is possible to eliminate the supports 22 by connecting the seat 10 directly to the vehicle's body in white or the floor of the vehicle (not shown).

The seat back 12 of the seat 10 includes a seat back frame member 24 in the form of a bent, U-shaped tubular member preferably having a substantially round cross section and including a first side 25, a second side 26 and a top 27.

The seat base 14 preferably includes a seat base frame including front support member 31 and a rear support member 32. The front support member 31 preferably includes a surface 33 having a ramped angle aligned toward the seat back 12 to operate as an anti-submarine surface. The front support member 31 is preferably fixedly attached to and extends between a first side member 35 and a second side member 36. the first and second side members 35 and 36 have a substantially c-shaped cross-section and extend toward the lower end of the seat back 12 to the rear support member 32 from the front support member 31 to form a substantially rectangular shaped seat base 14.

The seat base 14 is supported on the supports 22 using a pair of support leg members 37 and 38 for the front of the vehicle seat proximate the front support member 31. The support leg members 37 and 38 each preferably have a first or lower end 39 and 40, respectively, connected to a respective support 22 and each have a second or upper end 41 and 42, respectively, pivotally connected to the side members 35 and 36, respectively. Thus, the support leg member 37 pivots on an axis 43 defined by a pin 45 and the support leg member 38 pivots on preferably the same axis 43 defined by a pin 46.

Thus, in view of the above, it should be appreciated that the seat base 14 and its related structure have their motion defined at least partially by the support leg members 37 and 38. The folding vehicle seat further includes a pair of folding mechanisms 50 interconnecting the seat back 12, the seat base 14 and the supports 22. The pair of folding mechanisms 50 preferably include a first folding mechanism 50 associated with the side 25 of the seat back 12 and the side member 35 of the seat base 14 and a second folding mechanism 50 associated with the side 26 of the seat back 12 and the side member 36 of the seat base 14. The first side 25 of the seat back frame member 24 is preferably connected to the first folding mechanism 50 via a bracket 28 and the second side 26 of the seat back frame member 24 is connected to the second folding mechanism 50 via the bracket 29 utilizing bolts 30 or any other type of known or appropriate fastener. It should be understood that it is possible to directly connect the folding mechanisms 50 with the seat back frame member 24. Further, it should be understood that it is further possible to have the seat back frame member 24 integrated directly into the folding mechanisms 50 such that there is no need for a separate connection. Each folding mechanism 50 includes an activation member 52 as more fully described below.

Figure 6:
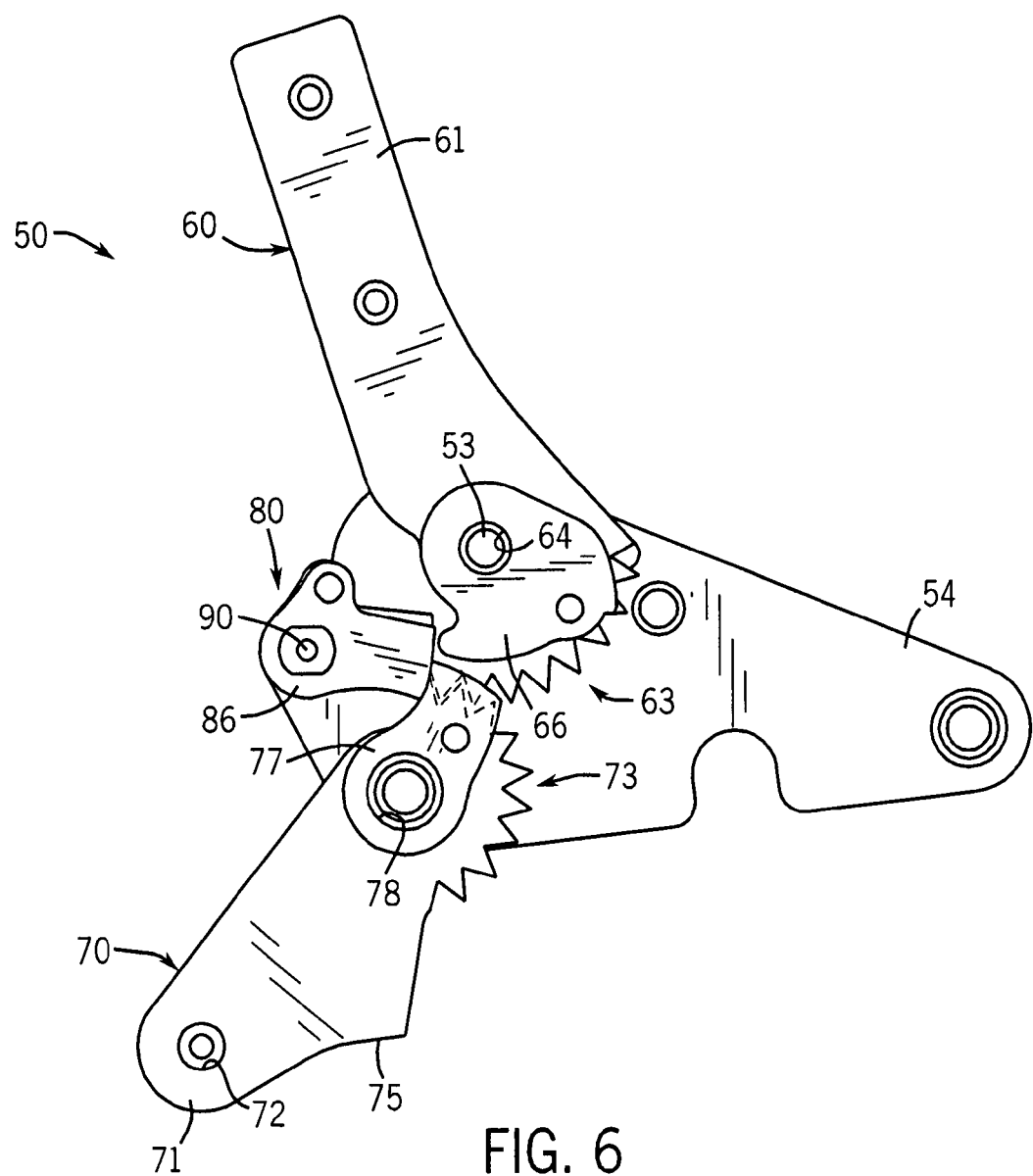
FIG. 6 is an isolated, partial side view of the vehicle seat of FIG. 1 showing the detail of a vehicle seat folding mechanism according to the present invention.
Figure 7:
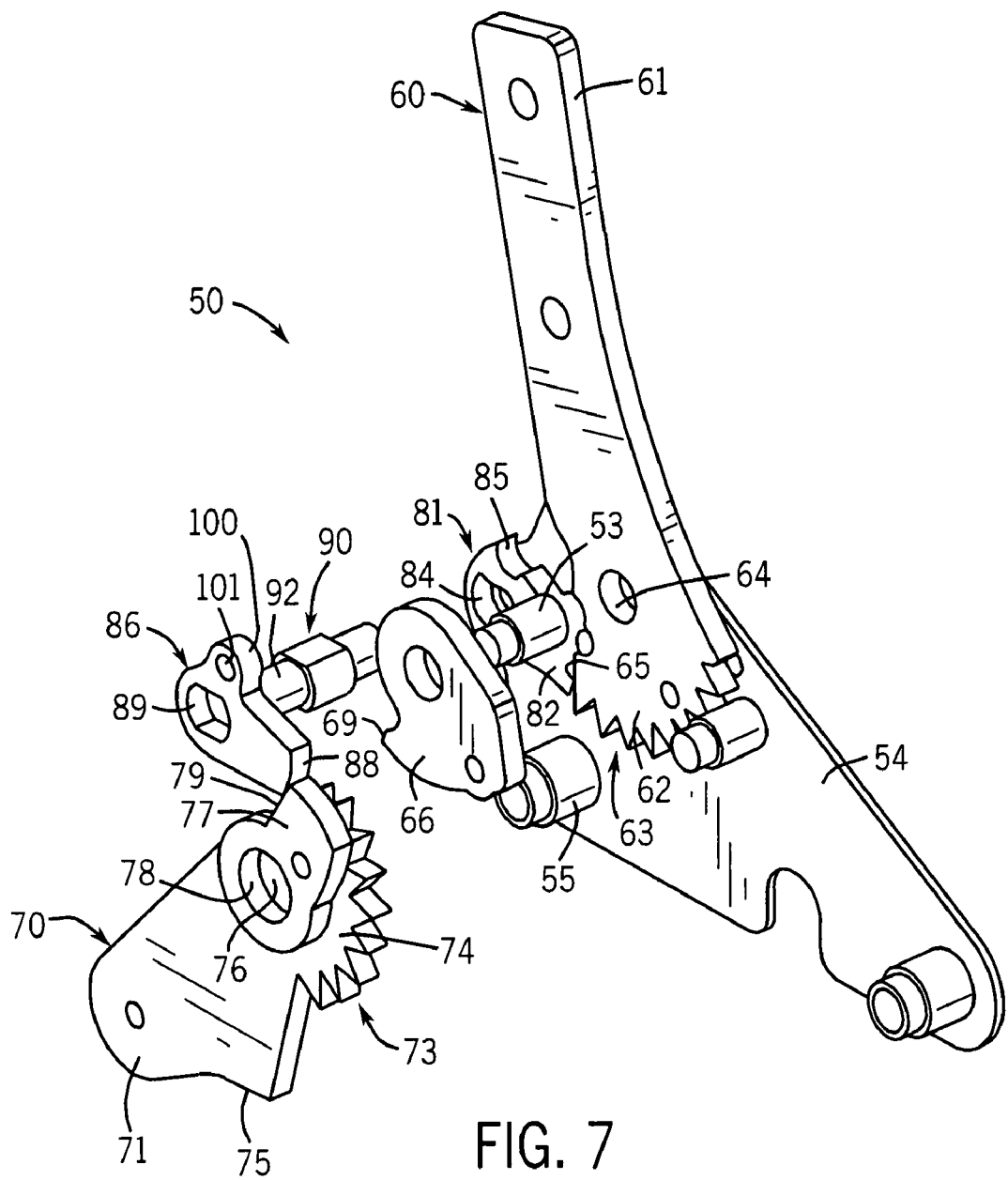
FIG. 7 is an exploded partial, perspective view of the vehicle seat folding mechanism according to the present invention.
Figure 8:
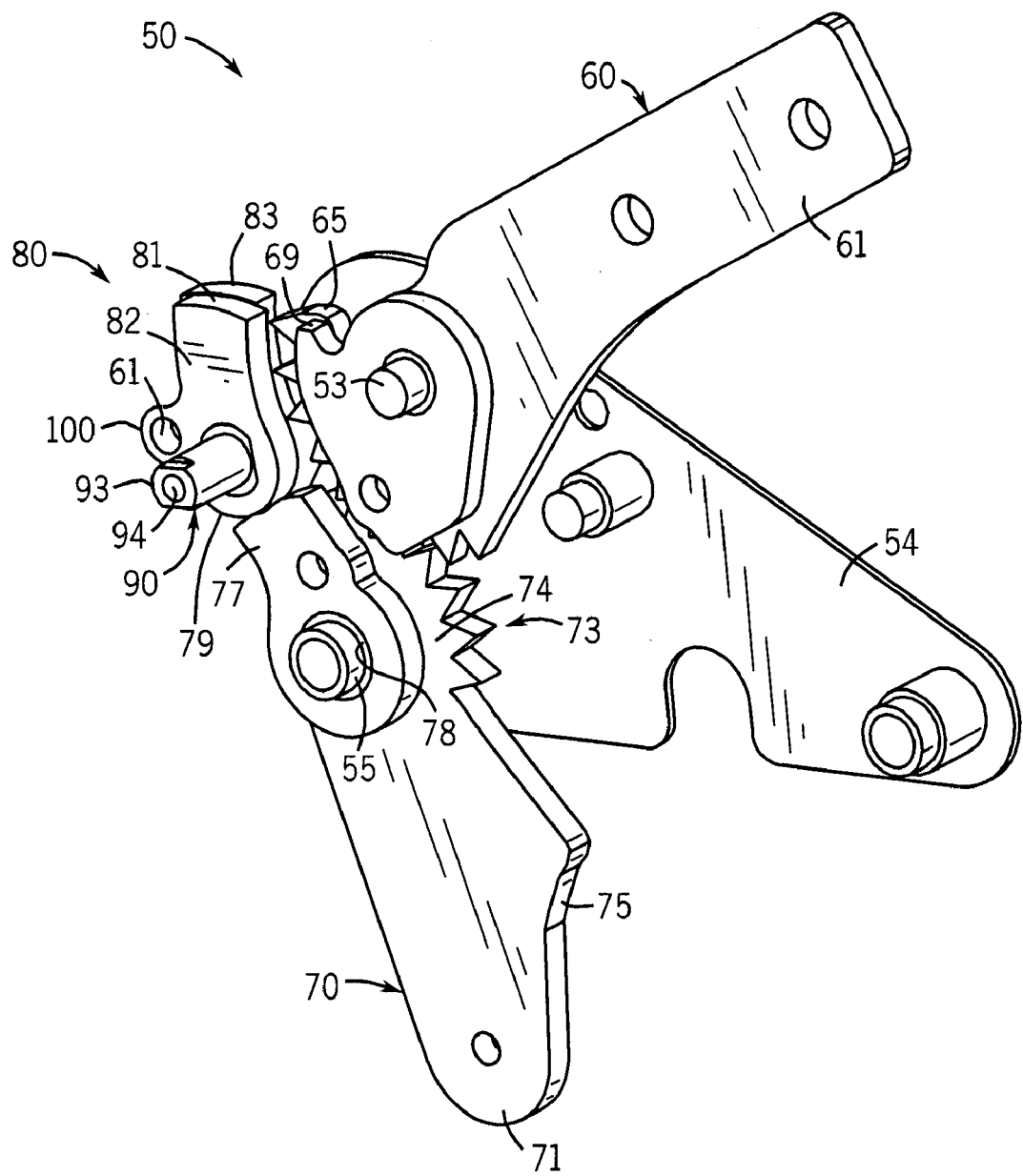
FIG. 8 is an isolated, partial side view similar to that shown in FIG. 7 showing the detail of a vehicle seat folding mechanism in an alternate position with the seat folding mechanism activated.

Referring more particularly now to FIG. 6 through FIG. 8 there is shown a folding mechanism 50 including a first or upper member 60 and a lower member 70. The upper member has a first or upper end 61 adapted to be connected to the seat back 12 as described above and a second or lower end 62 including a preferably unitary row of arcuately defined teeth 63. The upper member 60 preferably includes a passage 64 in the form of a hole and is pivotally supported on a pin member 53 journaled to support plate 54 such that the upper member rotates on an axis defined by the pin member 53. The upper member further includes an abutment surface 65 preferably located at an end of the teeth 63 and aligned to prevent rotation of the upper member 60 on the pin 53. The upper member 60 further preferably has associated and connected therewith a cam tab 66 in the form of an extension member and including a passage 68 in the form of a hole aligned with the passage 64 of the lower member 60. The cam tab 66 further preferably includes an abutment surface 69 located on one side of the cam tab 66. Preferably the tab member 66 is fixedly secured such as by welding or staking with the upper member 60 such that the upper member 60 may only move when the tab member 66 is free to move. Alternatively, the tab member 66 may be made as a unitary part of the upper member 60.

The support plate 54 also preferably includes a second pin member 55 spaced in a predefined relationship with respect to the pin 53. The support plate 54 is preferably adapted to be connected to the seat base 14.

The lower member 70 of the folding mechanism 50 preferably includes a lower end 71 adapted for connection to the support 22 by having a passage 72 preferably in the form of a hole to receive and pivot on a pin (not shown). The lower member 70 has a second end 74 distal of the first end 71 and including a preferably unitary row of arcuately defined teeth 73 preferably disposed on the end 74 such that the teeth 73 will mesh with the teeth 63 during the movement of the folding vehicle seat 10 between the stow position shown in FIG. 2 and the design position shown in FIG. 5.

It should be appreciated that the teeth 63 and teeth 73 continuously engage such that movement of the seat back 12 and the upper member 60 attached thereto causes synchronous movement of the lower member 70 and the seat base 14 attached thereto. Accordingly, the seat 10 can be operated with one hand by a user simply moving the seat back 12.

Figure 5:
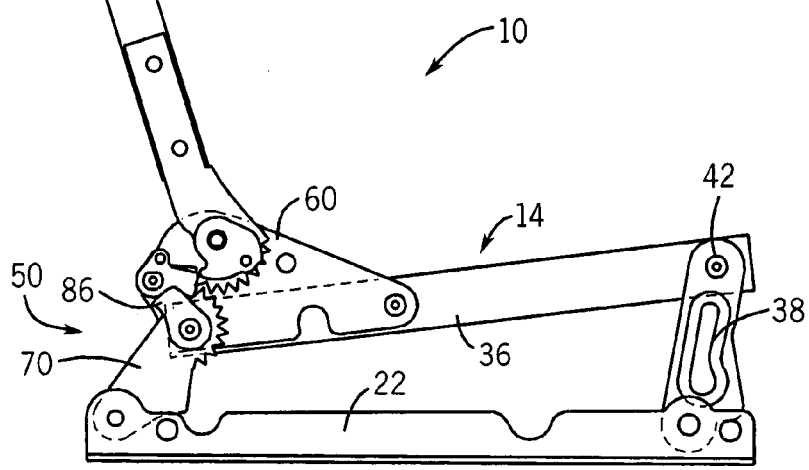
FIG. 5 is a side view of the folding vehicle seat of FIG. 1 in the design position.

The lower member 70 further includes an abutment surface 75 preferably located between the first end 71 and the second end 74 for engaging a pin (not shown) on the support 22 when the folding vehicle seat 10 is located in the design position of FIG. 5. The lower member 70 preferably includes a passage 76 in the form of a hole located in the second end 74 and with respect to the teeth 73 for receiving the pin 55 which defines an axis upon which the lower member 70 preferably rotates. Further, the lower member 70 preferably has associated and connected therewith a cam tab 77 in the form of an extension member and including a passage 78 in the form of a hole aligned with the passage 76 of the lower member 70. The cam tab 77 further preferably includes an abutment surface 79 located on one side of the cam tab 77. Preferably the tab member 77 is fixedly secured such as by welding or staking with the lower member 70 such that the lower member 70 may only move when the tab member 77 is free to move. Alternatively, the tab member 77 may be made as a unitary part of the lower member 70.

The folding mechanism 50 further preferably includes a dual cam lock mechanism 80 including a first upper cam member 81, a second upper cam member 86 and a cam pin member 90. The first upper cam member 81 is associated with the upper member 60 for engaging the upper member 60 and preventing its movement when the folding vehicle seat 10 is in the design position. The first upper cam member 81 preferably includes a lobe 82 having a cam surface 83 and a passage 84 for connection and rotation of the first upper cam 81 with the cam pin member 90.

The first upper cam member 81 further preferably includes a notch 85 located on one side thereof. The notch 85 is for receiving one end of a biasing member (not shown) preferably in the form of a clock spring for biasing the first upper cam member 81 in a first predetermined direction about the axis of rotation defined by the cam pin member 90. Preferably the first predetermined direction of rotation is chosen such that the first upper cam member 81 will have the cam surface 83 engage the abutment surface 65 of the first upper member 61 when the seat 10 is in the design position. The passage 84 of the first upper cam member 81 includes a double-D design such that it has two flat portions disposed approximately opposite of each other in the passage 84.

The second upper cam 86 is substantially similar to the first upper cam 81 but preferably has a few unique aspects. The second upper cam 86 includes a lobe 87 having a cam surface 88 for engaging the abutment surface 79 of the third cam tab member 77 of the lower member 70 to prevent movement of the lower member 70 when the seat 10 is in the design position.

The second upper cam 86 further preferably includes a passage 89 having a substantially round configuration in the form of a hole and including a pair of flat surface portions disposed substantially opposite each other. The second upper cam 86 further preferably includes a second lobe 100 including a passage 101 in the form of a hole for receiving one end of a biasing member (not shown) for biasing the second upper cam 86 in a predefined direction about the axis defined by the cam pin member 90.

The cam pin member 90 preferably includes a first post extension portion 91 journaled or otherwise pivotally connected with respect to the support plate 54. The first post extension portion 91 preferably has a round cross section.

The cam pin member 90 preferably includes a second post extension portion 92 located distally opposite the first post extension portion 91. The second post extension portion 92 preferably has a round cross section having an axis of rotation aligned with an axis of rotation of the first post extension portion 91. Similarly, the second post extension portion 92 is journaled or otherwise pivotally connected with respect to an opposite support plate (not shown) but extending beyond the opposite support plate such that an end 93 of the cam pin member 90 having a passage 94 therein may be connected to a handle member (not shown) for applying a force to rotate the cam pin member 90 and activate the folding mechanism 50.

The cam pin member 90 further includes a central portion 95 having a substantially round cross section including a pair of flat portions substantially oppositely disposed from each other. The central portion 95 is preferably complimentary with the passage 84 of the first upper cam 81 and the passage 89 of the second upper cam 86 such that rotation of the cam pin member 90 causes the first and second upper cams 81 and 86, respectively, to also rotate on the axis defined by the cam pin member 90.

As can be seen best in FIG. 8, when the cam pin member 90 is rotated such that the first and second upper cams 81 and 86 are disengaged from the upper member 60 and the lower member 70 and its third cam tab 77, the seat back 12 of the folding vehicle seat 10 is free to rotate. As the seat back 12 rotates in one direction, so does the upper member 60 and due to the meshing of the teeth 63 of the upper member and the teeth 73 of the lower member 70, the lower member 70 pivots about the passage 72 in an opposite direction.

Figure 1:
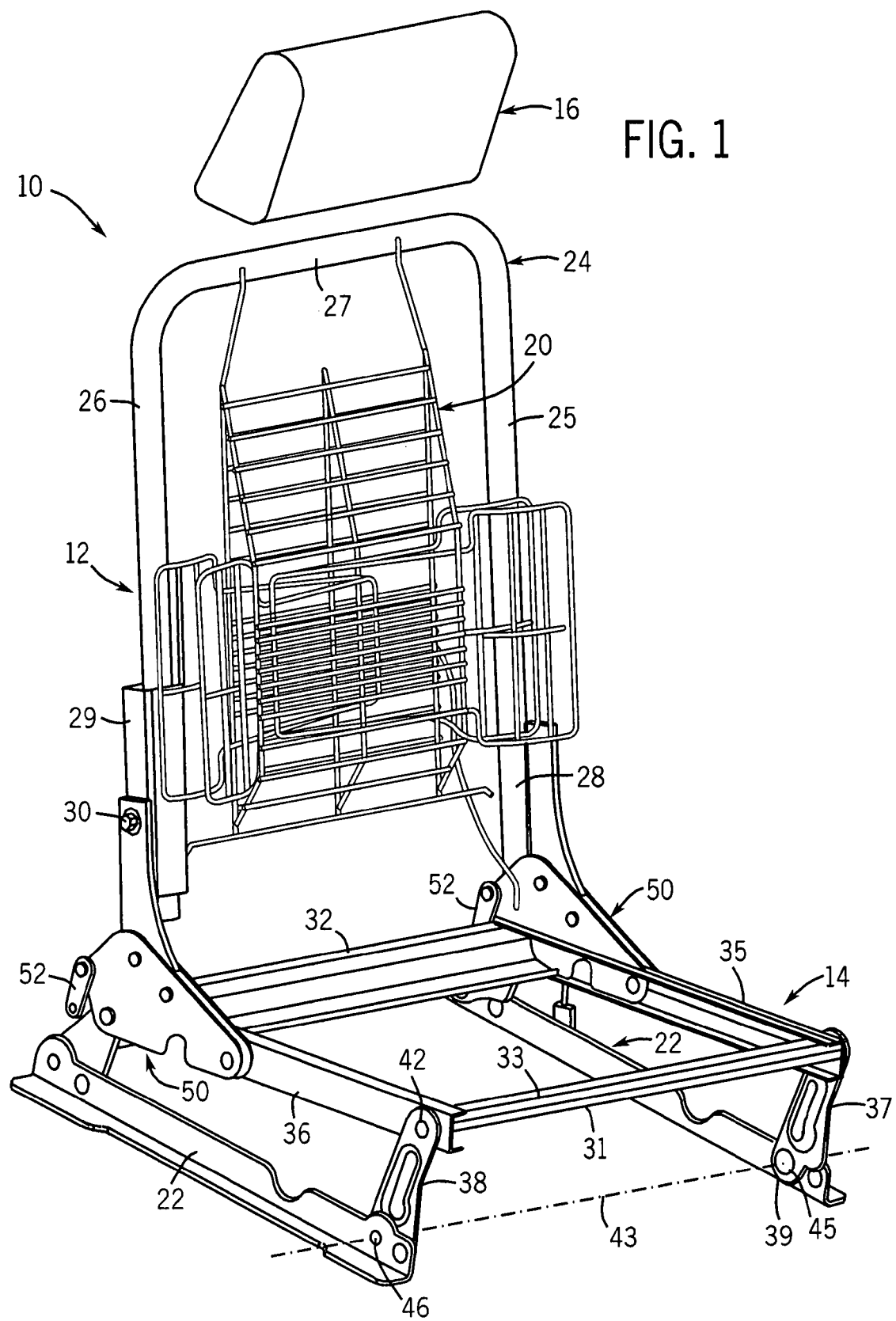
FIG. 1 is a perspective view of a folding vehicle seat according to the present invention.
Figure 2:
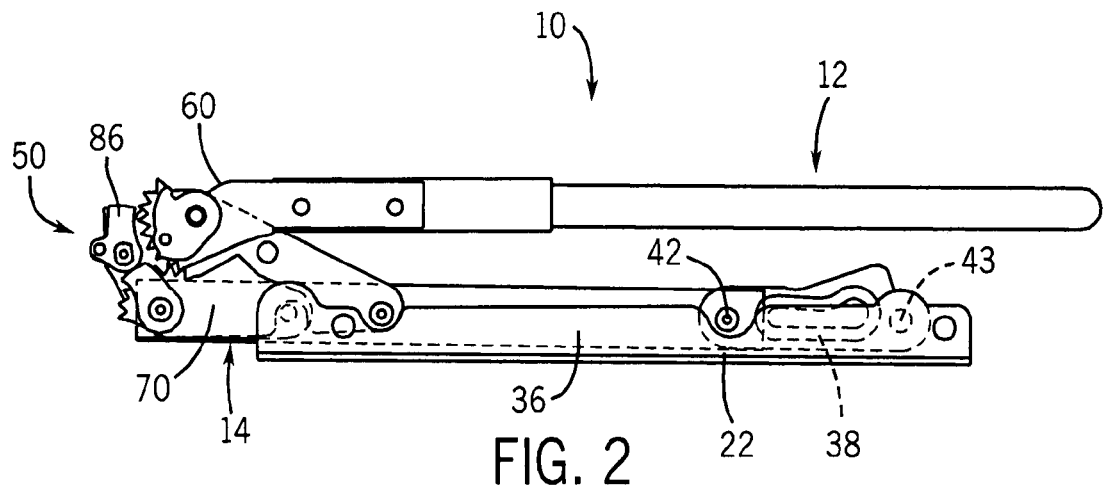
FIG. 2 is a side view of the folding vehicle seat of FIG. 1 located in a stow position.
Figure 3:
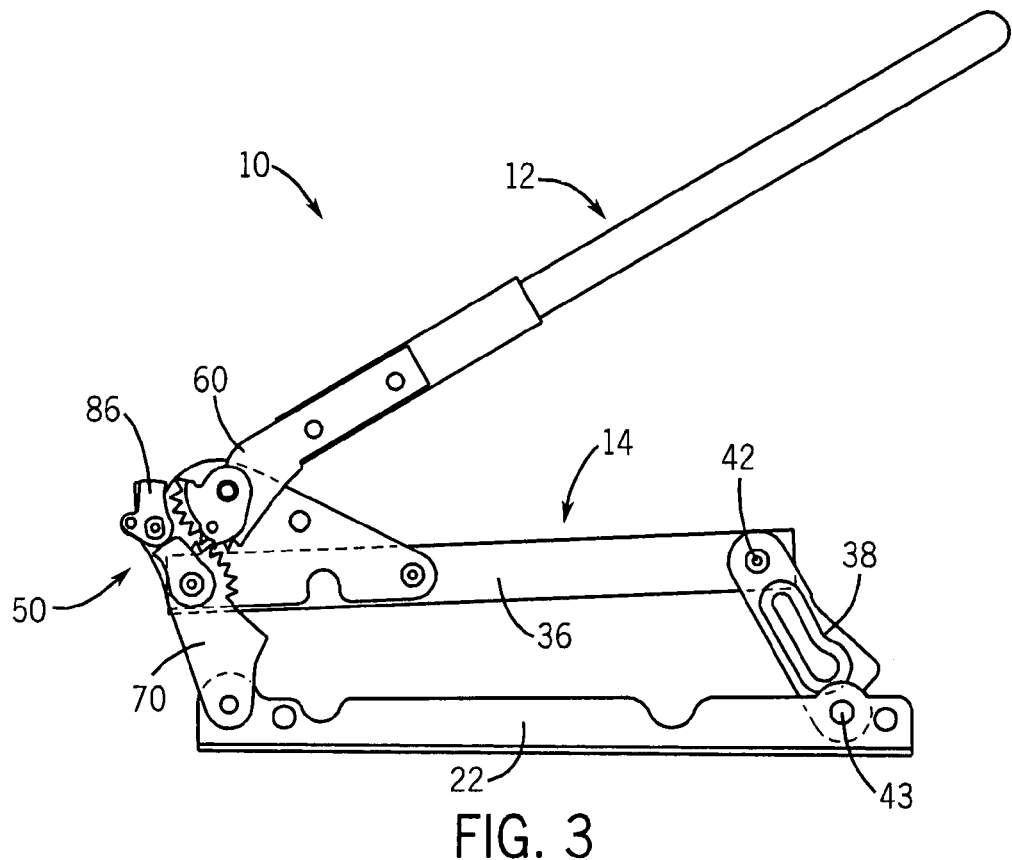
FIG. 3 is a side view of the folding vehicle seat of FIG. 1 moved partially from the stow position and toward a design position.
Figure 4:
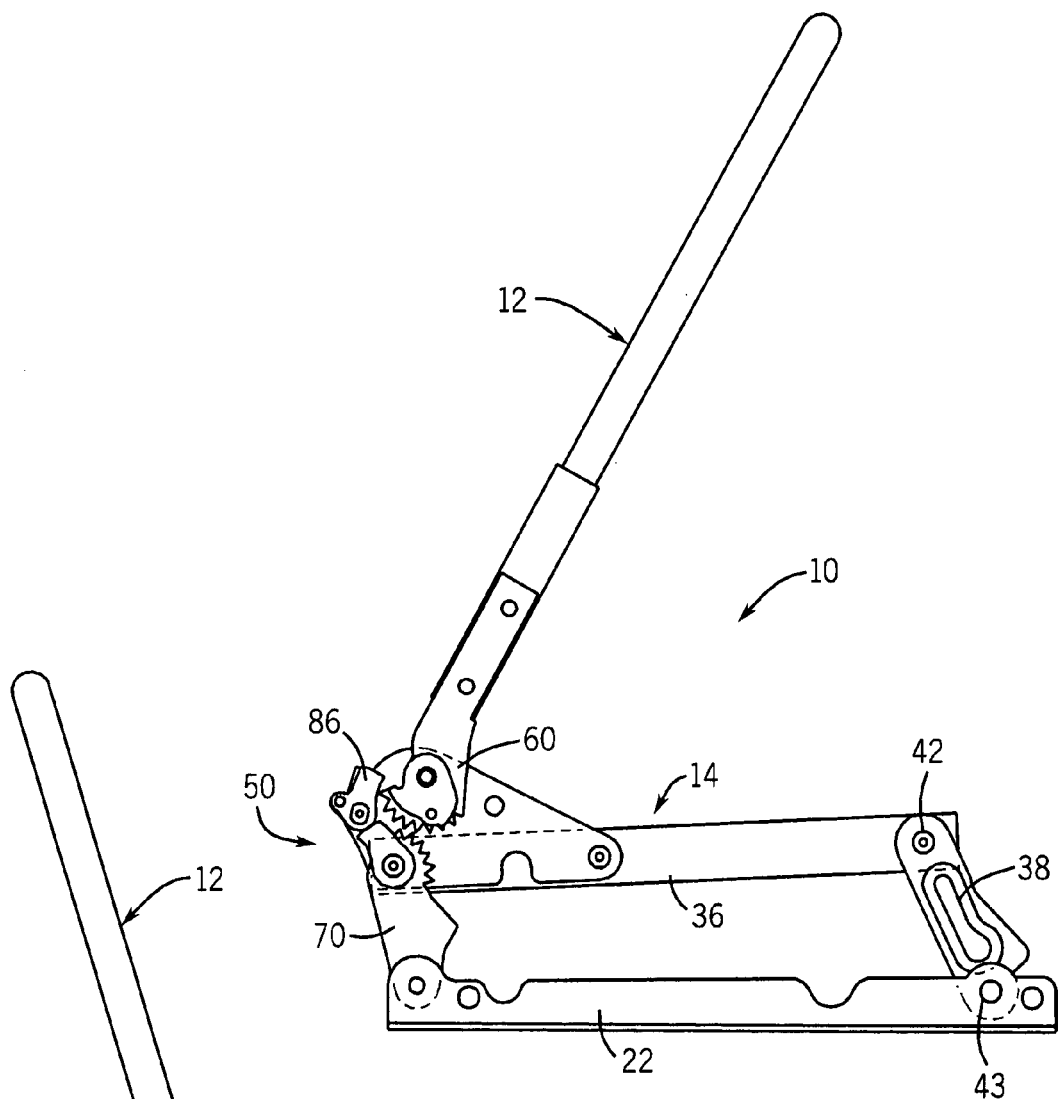
FIG. 4 is a side view of the folding vehicle seat of FIG. 1 moved partially from the design position and toward the stow position.

Referring to FIG. 2, the seat 10 is shown in a relatively very highly compact stow position. As a user lifts the seat back 12 the folding mechanism 50 causes the lower member 70 to rotate in an opposite direction. As the lower member 70 rotates, the seat base 14 is moved, causing the legs 37 and 38 to pivot from a substantially horizontal position due to the four bar linkage connection similar to a parallelogram, see FIG. 3. As the seat back 12 is further rotated, the seat 10 opens up (FIG. 4) and ultimately is located in the design position shown in FIG. 5 wherein the seat 10 is ready for an occupant. When the vehicle user desires that the seat 10 be put in the stow position, such as when a user needs additional storage in the rear of a vehicle, the cam pin member 90 is rotated a sufficient distance such that the first and second upper cams 81 and 86 are disengaged allowing the user to move the seat back 12 in an opposite direction and the seat 10 returns to the position of FIG. 4 until the seat 10 reaches the stow position of FIG. 2.

Figure 9:
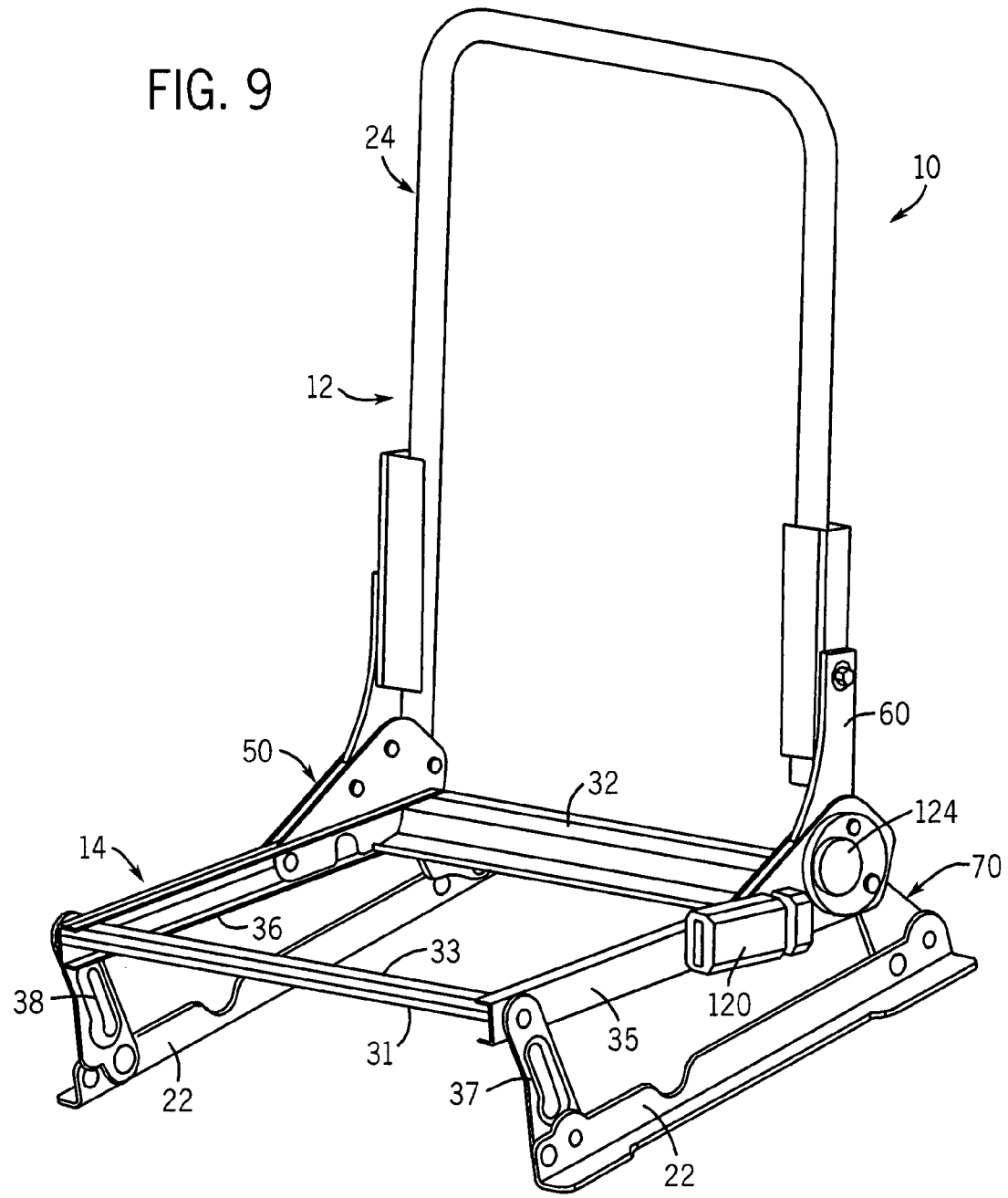
FIG. 9 is an isolated, partial perspective view of an alternate embodiment of the vehicle seat of FIG. 1.

In an alternate embodiment shown in FIG. 9, a motor 120 and gear drive mechanism 124 are attached to the folding mechanism 150. The gear drive mechanism 124 is connected with the upper member 60 to move the upper member 60 such that the seat 10 can be automated to move between the stow and design positions. The motor 120 is supplied with power from the vehicles power source and a switch (not shown) may be conveniently provided anywhere for activation by the user.

Figure 10:
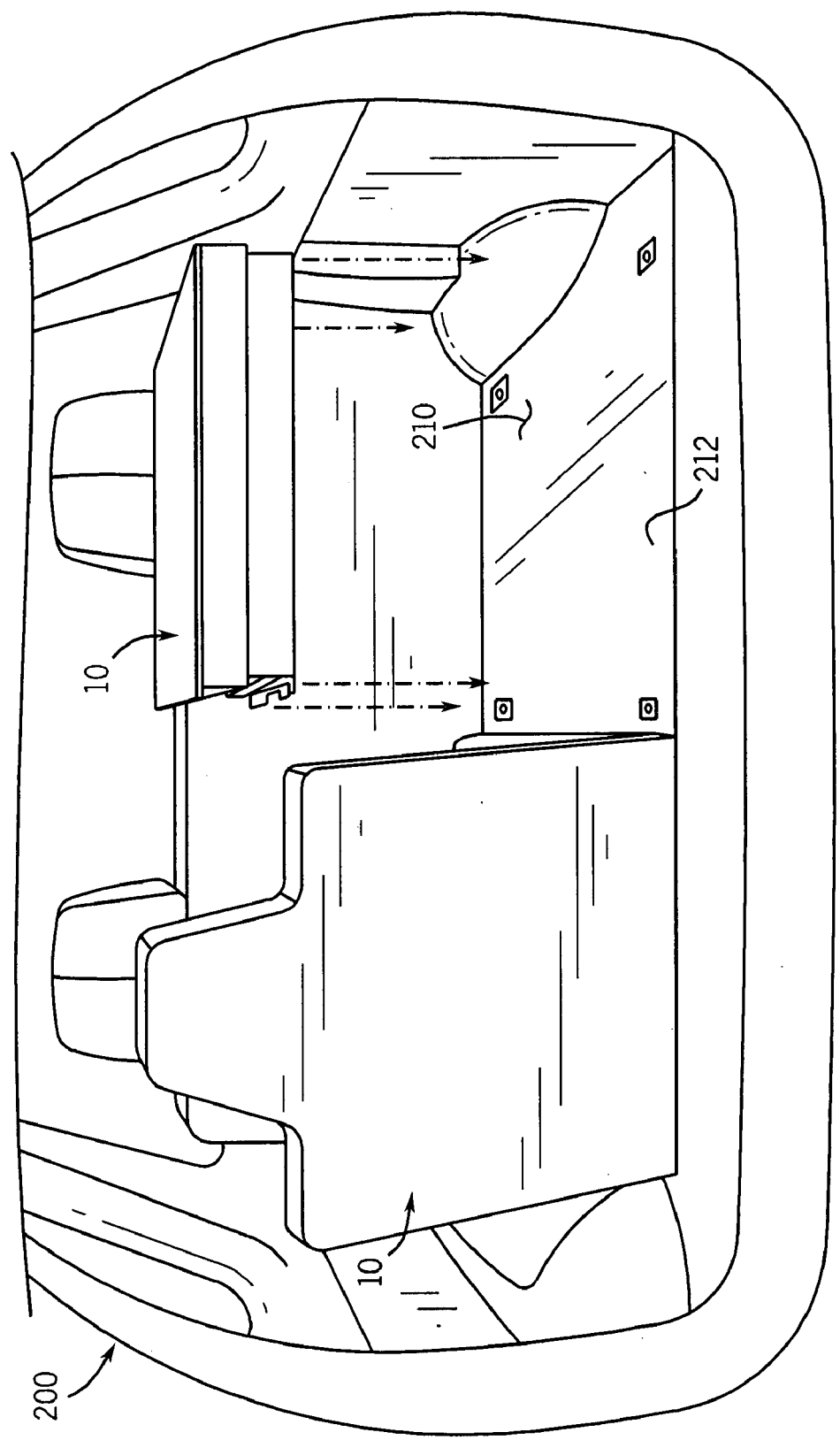
FIG. 10 is a rear view of a vehicle including a third row having a pair of folding vehicle seats including a cartridge design according to the present invention.
Figure 11:
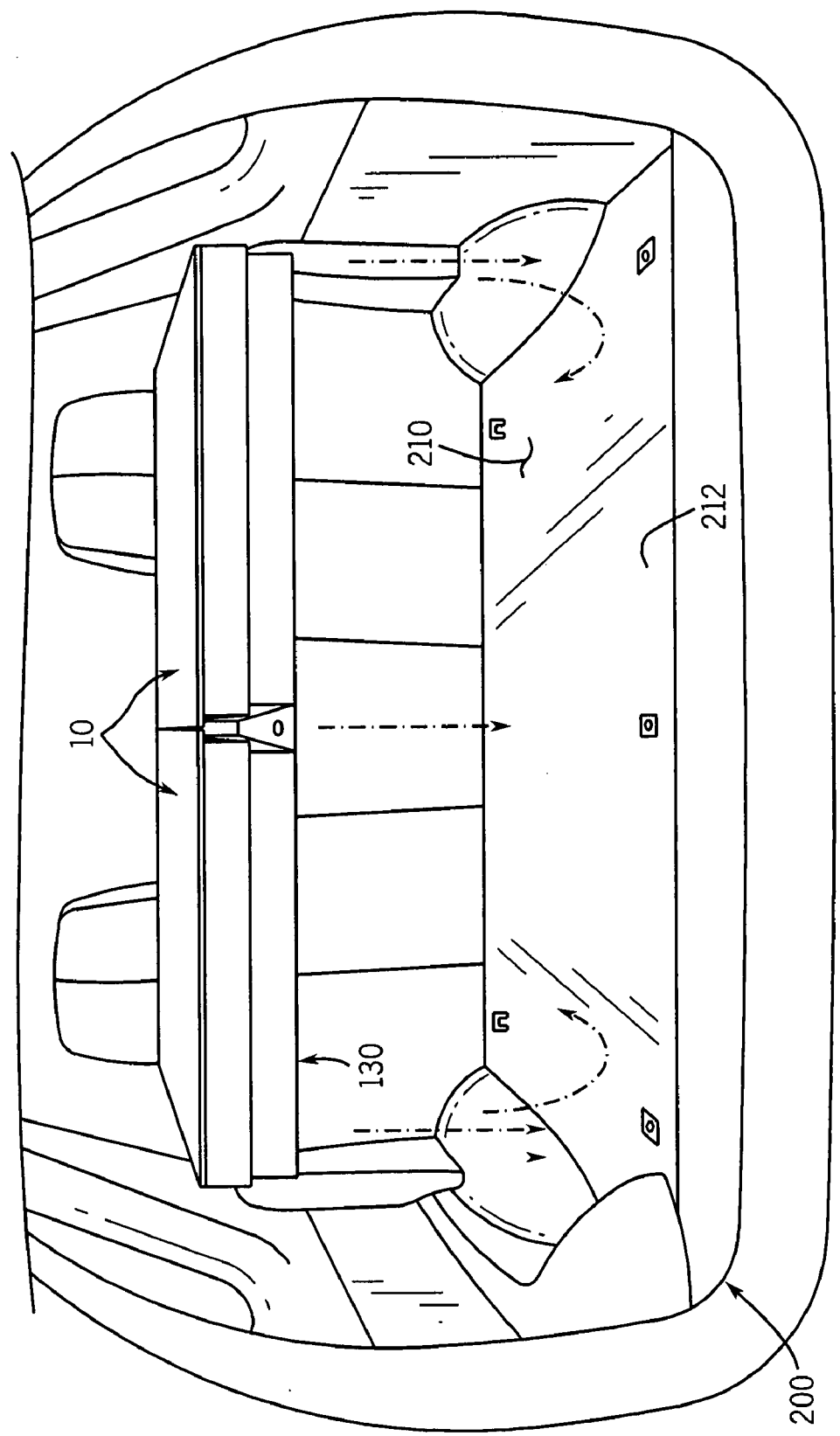
FIG. 11 is a rear view of a vehicle including a third row having a pair of folding vehicle seats according to an alternate embodiment including a cartridge design according to the present invention.
Figure 12:
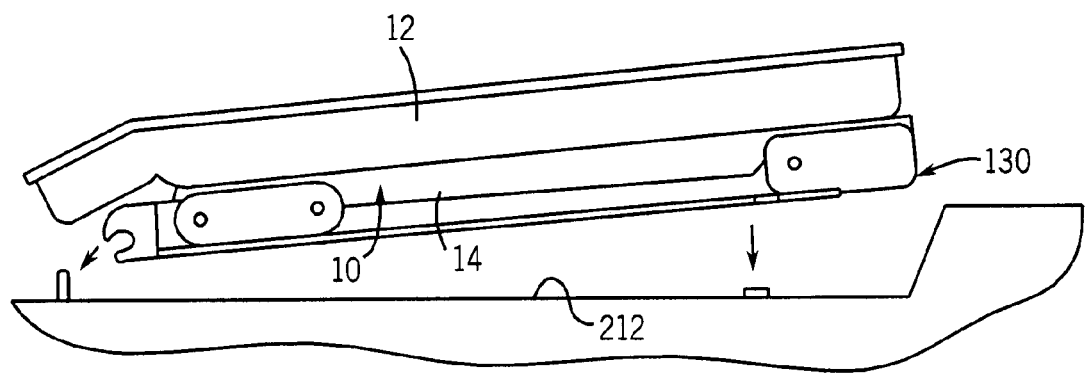
FIG. 12 is a schematic side view of the embodiment of FIG. 11 showing the technique for inserting the vehicle folding seat of the present invention into a vehicle.

In FIG. 10 there are shown two folding vehicle seats 10 in a rear cargo area 210 of a vehicle 200. In this embodiment, the seats 10 are designed to be removable from the vehicle 200 to provide for even further additional storage in the rear cargo area 210. As shown by the arrows, the seat 10 is connected to a floor 212 of the vehicle 200 using any known or appropriate removable connection including one such as that shown in FIG. 12. In FIG. 11 a further alternate embodiment of the present invention is shown, wherein two folding vehicle seats 10 are integrated into a unit 130 and can be removed from the rear cargo area 210 of the vehicle 200 with removal of the unit 130. Similarly, the unit 130 can be connected to the floor 212 using any known or appropriate removable connection as shown in FIG. 12.

While a preferred embodiment of the invention has been described in connection with the illustrations, and various modifications and alternatives thereto have been referred to in the written text, the present invention generally relates to a folding vehicle seat and folding mechanism having an upper arm member and a lower arm member in meshing relationship including first and second upper cams associated with the upper and lower arm members and a third lower cam tab associated with the lower arm member to provide a relatively very thin profile seat when in a stow position and which can be very easily (such as by a one hand operation) moved from a stow position to a design position. The invention is therefore not to be limited to the materials, shapes, orientations and proportions illustrated and described.

What is claimed is:

1. A seat cushion presenting device for use with a seat back frame, comprising:
    a seat cushion support member having a front side and a back side, the seat cushion support member including:
    a central body portion; and
    first and second side members coupled to the central body portion;
    first and second presenting members, each including:
    a first end positioned adjacent the back side of the seat cushion support member;
    a second end positioned adjacent the front side of the seat cushion support member;
    a presenting device support member extending between first and second sides of the seat back frame;
    a first guide member coupling the first end of the first presenting member to the presenting device support member;
    a second guide member coupling the first end of the second presenting member to the presenting device support member;
    a first connection clip for providing a movable connection between the first presenting member and one of the first and second side members;
    a second connection clip for providing a movable connection between the second presenting member and the other of the first and second side members; and
    an activation member for moving the first and second presenting members together along the presenting device support member,
    wherein each of the first and second guide members include:
    a first central portion having a passage therein for receiving and movement along the presenting device support member; and
    a plurality of legs spaced from said first and second connection clips and rotatably connected to the first end of the respective one of the first and second presenting members,
    wherein the first end of the first presenting member and the first end of the second presenting member move towards each other along the presenting device support member to move the presenting device from a stow position to an extended position.

2. The seat cushion presenting device of claim 1, wherein the activation member comprises:
    a lost motion device having a biasing member;
    a sheath having a first end coupled to the lost motion device and a second end coupled to the first guide member; and
    a wire having a first end coupled to the lost motion device and a second end coupled to the second guide member,
    wherein when a force is applied to the wire, the first guide member and the second guide member move towards each other, resulting in the seat cushion support member extending from the seat back support frame.

3. The seat cushion presenting device of claim 1, wherein the first end of the first presenting member and the first end of the second presenting member are contained within a thickness of the seat back frame member when the seat cushion support member is located in the stowed position.

4. The seat cushion presenting device of claim 1, wherein the first and second presenting members include a side bolster support member extending between the central body portion and one of said sides of said seat back frame.

5. The seat cushion presenting device of claim 4, wherein each side bolster support member includes a wire frame support structure.

6. The seat cushion presenting device of claim 1, wherein each connection clip comprises:
    a first portion rotatably connected to one of the first and second presenting members; and
    a second portion located distal of the first portion rotatably connected to the one of the side members adjacent to the one of the first and second presenting members.

7. The seat cushion presenting device of claim 6, wherein the first and second portions of each connection clip are adapted to prevent translation of the one of the first and second presenting members with respect to the seat cushion support member.

8. The seat cushion presenting device of claim 1, wherein the presenting device support member comprises a wire stretched taught between the first and second sides of the seat back frame member.

9. The seat cushion presenting device of claim 1, further comprising an inflatable bladder system, wherein the bladder system is substantially void of fluid when the seat cushion presenting device is in a stow position, and wherein the bladder system fills with fluid as the seat cushion presenting device is moved to a design position.

10. A vehicle seat, comprising:
    a seat back frame; and
    a seat cushion presenting device operatively connected to the seat back frame, the seat cushion presenting device comprising:
    a seat cushion support member having a front side and a back side, the seat cushion support member including:
    a central body portion; and
    first and second side members coupled to the central body portion;
    first and second presenting members, each of the first and second presenting members including:

a first end positioned adjacent the back side of the seat cushion support member;

a second end positioned adjacent the front side of the seat cushion support member;

a presenting device support member extending between first and second sides of the seat back frame;

a plurality of connection clips, each of which rotatably connecting one of the first and second presenting members to the adjacent respective one of the first and second side members;

a plurality of guide members each coupling one of the first and second presenting members to the presenting device support member, wherein each of the plurality of guide members include:

a first central portion having a passage therein for receiving and movement along the presenting device support member; and a plurality of legs spaced from said plurality of connection clips and rotatably connected to the first end of the respective one of the first and second presenting members; and wherein the first end of the first presenting member and the first end of the second presenting member move towards each other along the presenting device support member to move the presenting device from a stow position to an extended position.

11. The vehicle seat of claim 10, further comprising an activation member for moving the first and second presenting members together along the presenting device support member.

12. The vehicle seat of claim 11, wherein the activation member comprises:

a lost motion device having a biasing member;

a sheath having a first end coupled to the lost motion device and a second end coupled to one of the plurality of guide members; and a wire having a first end coupled to the lost motion device and a second end coupled to another of the plurality of guide members, wherein when a force is applied to the wire, the plurality of guide members move towards each other, resulting in the seat cushion support member extending from the seat back support frame.

13. The vehicle seat of claim 11, further comprising an inflatable bladder system, wherein the bladder system is substantially void of fluid when the seat cushion presenting device is in a stow position, and wherein the bladder system fills with fluid as the seat cushion presenting device is moved to a design position.

14. The vehicle seat of claim 11, wherein the presenting device support member comprises a wire stretched taut between the first and second sides of the seat back frame member.

15. The vehicle seat of claim 11, wherein the first end of the first presenting member and the first end of the second presenting member are contained within a thickness of the seat back frame member when the seat cushion support member is located in the stowed position.

* * * * *